US007359465B2

(12) United States Patent
Olson et al.

(10) Patent No.: US 7,359,465 B2
(45) Date of Patent: Apr. 15, 2008

(54) SERIAL CANCELLATION RECEIVER DESIGN FOR A CODED SIGNAL PROCESSING ENGINE

(75) Inventors: Eric S. Olson, Milwaukee, WI (US); Anand P. Narayan, Boulder, CO (US); John K. Thomas, Erie, CO (US)

(73) Assignee: TENSORCOMM, Inc, Westminster, CO (US)

( * ) Notice: Subject to any disclaimer, the term of this patent is extended or adjusted under 35 U.S.C. 154(b) by 399 days.

(21) Appl. No.: 11/103,138

(22) Filed: Apr. 11, 2005

(65) Prior Publication Data

US 2005/0180496 A1    Aug. 18, 2005

Related U.S. Application Data

(62) Division of application No. 10/247,836, filed on Sep. 20, 2002, now Pat. No. 7,158,559.

(60) Provisional application No. 60/354,093, filed on Feb. 5, 2002, provisional application No. 60/348,106, filed on Jan. 14, 2002, provisional application No. 60/333,143, filed on Nov. 27, 2001, provisional application No. 60/331,480, filed on Nov. 16, 2001, provisional application No. 60/326,199, filed on Oct. 2, 2001, provisional application No. 60/325,215, filed on Sep. 28, 2001.

(51) Int. Cl.
*H03D 1/04* (2006.01)
(52) U.S. Cl. ....................................... 375/346
(58) Field of Classification Search ............ 375/347, 375/346; 455/133–136
See application file for complete search history.

(56) References Cited

U.S. PATENT DOCUMENTS 3,742,201 A   6/1973   Groginsky

| 4,088,955 A | 5/1978 | Baghdady |
| 4,309,769 A | 1/1982 | Taylor, Jr. |
| 4,359,738 A | 11/1982 | Lewis |

(Continued)

FOREIGN PATENT DOCUMENTS

DE   4201439 A1   7/1993

(Continued)

OTHER PUBLICATIONS

Mitra, et al., Adaptive Decorrelating Detectors for CDMA Systems, Accepted for Wireless Communications Journal, Accepted May 1995.

(Continued)

*Primary Examiner*—Kevin Kim
(74) *Attorney, Agent, or Firm*—Anand P. Narayan

(57) ABSTRACT

A novel serial receiver for a wireless communication system is provided. The communication system comprises: a receiver for receiving a signal y having data parameters; a control processor; the control processor for receiving the signal y and the data parameters; at least two fingers, the control processor for determining which of the data parameters are sent to respective fingers, wherein the at least two fingers have at least a search finger and a tracking finger; and wherein the tracking finger comprises a correlator and a Coded Signal Processing Engine (CSPE), the CSPE for interference cancellation in the reception of the signal y. In addition, numerous other embodiments of the serial receiver are provided along with methods for using the serial receiver.

67 Claims, 18 Drawing Sheets

U.S. PATENT DOCUMENTS

| | | | |
|---|---|---|---|
| 4,601,046 A | 7/1986 | Halpern | |
| 4,665,401 A | 5/1987 | Garrard et al. | |
| 4,670,885 A | 6/1987 | Parl et al. | |
| 4,713,794 A | 12/1987 | Byington et al. | |
| 4,780,885 A | 10/1988 | Paul et al. | |
| 4,856,025 A | 8/1989 | Takai | |
| 4,893,316 A | 1/1990 | Janc et al. | |
| 4,922,506 A | 5/1990 | McCallister et al. | |
| 4,933,639 A | 6/1990 | Barker | |
| 4,965,732 A | 10/1990 | Roy, III et al. | |
| 5,017,929 A | 5/1991 | Tsuda | |
| 5,099,493 A | 3/1992 | Zeger et al. | |
| 5,105,435 A | 4/1992 | Stilwell | |
| 5,109,390 A | 4/1992 | Gilhousen et al. | |
| 5,119,401 A | 6/1992 | Tsujimoto | |
| 5,136,296 A | 8/1992 | Roettger et al. | |
| 5,151,919 A | 9/1992 | Dent | |
| 5,218,359 A | 6/1993 | Minamisono | |
| 5,218,619 A | 6/1993 | Dent | |
| 5,220,687 A | 6/1993 | Ichikawa et al. | |
| 5,224,122 A | 6/1993 | Bruckert | |
| 5,237,586 A | 8/1993 | Bottomley | |
| 5,263,191 A | 11/1993 | Dickerson | |
| 5,280,472 A | 1/1994 | Gilhousen et al. | |
| 5,305,349 A | 4/1994 | Dent | |
| 5,325,394 A | 6/1994 | Bruckert | |
| 5,343,493 A | 8/1994 | Karimullah | |
| 5,343,496 A | 8/1994 | Honig et al. | |
| 5,347,535 A | 9/1994 | Karasawa et al. | |
| 5,353,302 A | 10/1994 | Bi | |
| 5,377,183 A | 12/1994 | Dent | |
| 5,386,202 A | 1/1995 | Cochran et al. | |
| 5,390,207 A | 2/1995 | Fenton et al. | |
| 5,394,110 A | 2/1995 | Mizoguchi | |
| 5,396,256 A | 3/1995 | Chiba et al. | |
| 5,437,055 A | 7/1995 | Wheatley, III | |
| 5,440,265 A | 8/1995 | Cochran et al. | |
| 5,448,600 A | 9/1995 | Lucas | |
| 5,481,570 A | 1/1996 | Winters | |
| 5,506,865 A | 4/1996 | Weaver, Jr. | |
| 5,513,176 A | 4/1996 | Dean et al. | |
| 5,533,011 A | 7/1996 | Dean et al. | |
| 5,553,098 A | 9/1996 | Cochran et al. | |
| 5,602,833 A | 2/1997 | Zehavi | |
| 5,644,592 A | 7/1997 | Divsalar | |
| 5,736,964 A | 4/1998 | Ghosh et al. | |
| 5,787,130 A | 7/1998 | Kotzin et al. | |
| 5,844,521 A | 12/1998 | Stephens et al. | |
| 5,859,613 A | 1/1999 | Otto | |
| 5,872,540 A | 2/1999 | Casabona | |
| 5,872,776 A | 2/1999 | Yang | |
| 5,894,500 A | 4/1999 | Bruckert et al. | |
| 5,926,761 A | 7/1999 | Reed et al. | |
| 5,930,229 A | 7/1999 | Yoshida et al. | |
| 5,953,369 A | 9/1999 | Suzuki | |
| 5,978,413 A | 11/1999 | Bender | |
| 5,995,499 A | 11/1999 | Hottinen et al. | |
| 6,002,727 A | 12/1999 | Uesugi | |
| 6,014,373 A | 1/2000 | Schilling et al. | |
| 6,018,317 A | 1/2000 | Dogan et al. | |
| 6,032,056 A | 2/2000 | Reudink | |
| 6,088,383 A | 7/2000 | Suzuki et al. | |
| 6,101,385 A | 8/2000 | Monte et al. | |
| 6,104,712 A | 8/2000 | Robert et al. | |
| 6,115,409 A | 9/2000 | Upadhyay et al. | |
| 6,127,973 A | 10/2000 | Choi et al. | |
| 6,131,013 A | 10/2000 | Bergstrom et al. | |
| 6,137,788 A | 10/2000 | Sawahashi et al. | |
| 6,141,332 A | 10/2000 | Lavean | |
| 6,154,443 A | 11/2000 | Huang et al. | |
| 6,157,685 A | 12/2000 | Tanaka et al. | |
| 6,157,842 A | 12/2000 | Karlsson et al. | |
| 6,157,847 A | 12/2000 | Buehrer et al. | |
| 6,163,696 A | 12/2000 | Bi et al. | |
| 6,166,690 A | 12/2000 | Lin et al. | |
| 6,172,969 B1 | 1/2001 | Kawakami et al. | |
| 6,175,587 B1 | 1/2001 | Madhow et al. | |
| 6,192,067 B1 | 2/2001 | Toda et al. | |
| 6,201,799 B1 | 3/2001 | Huang et al. | |
| 6,215,812 B1 | 4/2001 | Young et al. | |
| 6,219,376 B1 | 4/2001 | Zhodzishsky et al. | |
| 6,222,828 B1 | 4/2001 | Ohlson et al. | |
| 6,230,180 B1 | 5/2001 | Mohamed | |
| 6,233,229 B1 | 5/2001 | Ranta et al. | |
| 6,233,459 B1 | 5/2001 | Sullivan et al. | |
| 6,240,124 B1 | 5/2001 | Wiedeman et al. | |
| 6,252,535 B1 | 6/2001 | Kober et al. | |
| 6,256,336 B1 | 7/2001 | Rademacher et al. | |
| 6,259,688 B1 | 7/2001 | Schilling et al. | |
| 6,263,208 B1 | 7/2001 | Chang et al. | |
| 6,266,529 B1 | 7/2001 | Chheda | |
| 6,275,186 B1 | 8/2001 | Kong | |
| 6,278,726 B1 | 8/2001 | Mesecher et al. | |
| 6,282,231 B1 | 8/2001 | Norman et al. | |
| 6,282,233 B1 | 8/2001 | Yoshida | |
| 6,285,316 B1 | 9/2001 | Nir et al. | |
| 6,285,319 B1 | 9/2001 | Rose | |
| 6,285,861 B1 | 9/2001 | Bonaccorso et al. | |
| 6,301,289 B1 | 10/2001 | Bejjani et al. | |
| 6,304,618 B1 | 10/2001 | Hafeez et al. | |
| 6,308,072 B1 | 10/2001 | Labedz et al. | |
| 6,310,704 B1 | 10/2001 | Dogan et al. | |
| 6,317,453 B1 | 11/2001 | Chang | |
| 6,321,090 B1 | 11/2001 | Soliman | |
| 6,324,159 B1 | 11/2001 | Mennekens et al. | |
| 6,327,471 B1 | 12/2001 | Song | |
| 6,330,460 B1 | 12/2001 | Wong et al. | |
| 6,333,947 B1 | 12/2001 | van Heeswyk et al. | |
| 6,351,235 B1 | 2/2002 | Stilp | |
| 6,351,642 B1 | 2/2002 | Corbett et al. | |
| 6,359,874 B1 | 3/2002 | Dent | |
| 6,362,760 B2 | 3/2002 | Kober et al. | |
| 6,363,104 B1 | 3/2002 | Bottomley | |
| 6,377,636 B1 | 4/2002 | Paulraj et al. | |
| 6,380,879 B2 | 4/2002 | Kober et al. | |
| 6,385,264 B1 | 5/2002 | Terasawa | |
| 6,396,804 B2 | 5/2002 | Odenwalder | |
| 6,404,760 B1 | 6/2002 | Holtzman et al. | |
| 6,430,216 B1 | 8/2002 | Kober et al. | |
| 6,459,693 B1 | 10/2002 | Park et al. | |
| 6,501,788 B1 | 12/2002 | Wang | |
| 6,515,980 B1 | 2/2003 | Bottomley | |
| 6,570,909 B1 | 5/2003 | Kansakoski | |
| 6,574,270 B1 | 6/2003 | Madkour | |
| 6,580,771 B2 | 6/2003 | Kenney | |
| 6,584,115 B1 | 6/2003 | Suzuki | |
| 6,590,888 B1 | 7/2003 | Ohshima | |
| 6,680,727 B2 | 1/2004 | Butler | |
| 6,771,988 B2 * | 8/2004 | Matsuoka et al. ........ 455/562.1 |
| 6,798,737 B1 | 9/2004 | Dabak | |
| 6,801,565 B1 | 10/2004 | Bottomley | |
| 2001/0003443 A1 | 6/2001 | Velazquez et al. | |
| 2001/0020912 A1 | 9/2001 | Naruse et al. | |
| 2001/0021646 A1 | 9/2001 | Antonucci et al. | |
| 2001/0046266 A1 | 11/2001 | Rakib et al. | |
| 2002/0001299 A1 | 1/2002 | Petch et al. | |
| 2002/0051433 A1 | 5/2002 | Affes et al. | |
| 2002/0172173 A1 | 11/2002 | Schilling et al. | |
| 2002/0176488 A1 | 11/2002 | Kober et al. | |
| 2003/0053526 A1 | 3/2003 | Reznik | |

FOREIGN PATENT DOCUMENTS

| | | |
|---|---|---|
| DE | 4326843 A1 | 2/1995 |

| | | |
|---|---|---|
| DE | 4343959 A1 | 6/1995 |
| EP | 0558910 A1 | 1/1993 |
| EP | 0610989 A2 | 1/1994 |
| GB | 2280575 A | 2/1995 |
| JP | 2000-13360 A | 1/2000 |
| WO | WO 93/12590 | 6/1995 |

OTHER PUBLICATIONS

Schneider, Optimum Detection of Code Division Multiplexed Signals, IEEE Transactions on Aerospace and Electronic Systems, Jan. 1979, vol. AES-15 No. 1.

Mitra, et al., Adaptive Receiver Algorithms for Near-Far Resistant CDMA, IEEE Transactions of Communications, Apr. 1995.

Lupas, et al. Near-Far Resistance of Multiuser Detectors in Asynchronous Channels, IEEE Transactions on Communications, Apr. 1990, vol. 38, No. 4.

Lupas, et al., Linear Multiuser Detectors for Synchronous Code-Division Multiple-Access Channels, IEEE Transactions on Information Theory, Jan. 1989, vol. 35, No. 1.

Kohno, et al., Cancellation Techniques of Co-Channel Interference in Asynchronous Spread Spectrum Multiple Access Systems, May 1983, vol. J 56-A. No. 5.

Garg, et al., Wireless and Personal Communications Systems, 1996, pp. 79-151, Prentice Hall, Upper Saddle River, NJ, US.

Cheng, et al., Spread-Spectrum Code Acquisition in the Presence of Doppler Shift and Data Modulation, IEEE Transactions on Communications, Feb. 1990, vol. 38, No. 2.

Behrens et al., Parameter Estimation in the Presence of Low Rank Noise, pp. 341-344, Maple Press, 1988.

Best, Phase-Locked Loops—Design, Simulation, and Applications, pp. 251-287, McGraw-Hill, 1999.

Iltis, Multiuser Detection of Quasisynchronous CDMA Signals Using Linear Decorrelators, IEEE Transactions on Communications, Nov. 1996, vol. 44, No. 11.

Rappaport, Wireless Communications—Principles & Practice, 1996, pp. 518-533, Prentice Hall, Upper Saddle River, NJ, US.

Scharf, et al., Matched Subspace Detectors, IEEE Transactions on Signal Processing, Aug. 1994, vol. 42, No. 8.

Price et al., A Communication Technique for Multipath Channels, Proceedings to the IRE, 1958, vol. 46, The Institute of Radio Engineers, New York, NY, US.

Affes et al., Interference Subspace Rejection: A Framework for Multiuser Detection in Wideband CDMA, IEEE Journal on Selected Areas in Communications, Feb. 2002, vol. 20, No. 2.

Schlegel et al., Coded Asynchronous CDMA and Its Efficient Detection, IEEE Transactions on Information Theory, Nov. 1998, vol. 44, No. 7.

Xie et al. , A family of Suboptimum Detectors for Coherent Multiuser Communications, IEEE Journal on Selected Areas in Communications, May 1990, vol. 8, No. 4.

Viterbi, Very Low Rate Convolutional Codes for Maximum Theoretical Performance of Spread Spectrum Multiple-Access Channels, IEEE Journal on Selected Areas in Communications, May 1990, vol. 8, No. 4.

Viterbi, CDMA—Principles of Spread Spectrum Communication, 1995, pp. 11-75 and 179-233, Addison-Wesley, Reading, MA, US.

Verdu, Mimimum Probability of Error for Asynchronous Gaussian Multiple-Access Channels, IEEE Transactions on Information Theory, Jan. 1986, vol. IT-32, No. 1.

Kaplan, Understanding GPS—Principles and Applications, 1996, pp. 83-236, Artech House, Norwood, MA, US.

Scharf, Statistical Signal Processing—Detection, Estimation, and Time Series Analysis, 1990, pp. 23-75 and 103-178, Addison-Wesly, Reading, MA, US.

Stimson, Introduction to Airborne Radar 2nd edition, 1998, pp. 163-176 and 473-491, SciTech Publishing, Mendham, NJ, US.

Behrens et al., Signal Processing Applications of Oblique Projection Operators, IEEE Transactions on Signal Processing, Jun. 1994, vol. 42, No. 6.

Alexander et al., A Linear Receiver for Coded Multiuser CDMA, IEEE Transactions on Communications, May 1997, vol. 45, No. 5.

Schlegel et al., Multiuser Projection Receivers, IEEE Journal on Selected Areas in Communications, Oct. 1996, vol. 14, No. 8.

Halper et al., Digital-to-Analog Conversio n by Pulse-Count Modulation Methods, IEEE Transactions on Instrumentation and Measurement, Aug. 1996, vol. 45, No. 4.

Ortega et al., Analog to Digital and Digital to Analog Conversion Based on Stochastic Logic, IEEE 0-7803-3026-9/95, 1995.

Frankel et al., High-performance photonic analogue digital converter, Electronic Letters, Dec. 4, 1997, vol. 33, No. 25.

Lin et al., Digital Filters for High Performance Audio Delta-sigma Analog-to-digital and Digital-to-analog Conversions, Proceedings of ICSP, Crystal Semiconductor Corporation, 1996, Austin, TX, US.

Thomas, Thesis for the Doctor of Philosophy Degree, UMI Dissertation Services, Jun. 1996, Ann Arbor, MI, US.

Schlegel et al., Projection Receiver: A New Efficient Multi-User Detector, IEEE, 1995, 0-7803-2509-5/95.

Behrens, Subspace Signal Processing in Structured Noise, UMI Dissertation Services, Jun. 1990, Ann Arbor, MI, US.

* cited by examiner

(PRIOR ART)

Applying Projection Operator to a Reference Signal

The vertical lines are used to denote segments and occur at symbol boundaries

Forward Link Receiver

IS-95 Processing Finger

IS-95 Hadamard Transform

800

IS-95 Generation of S Matrix

IS-95 Generation of S Matrix

IS-95 Generation of S Matrix

CDMA2000 Searcher

FIG. 15
CDMA2000 Amplitude Estimator
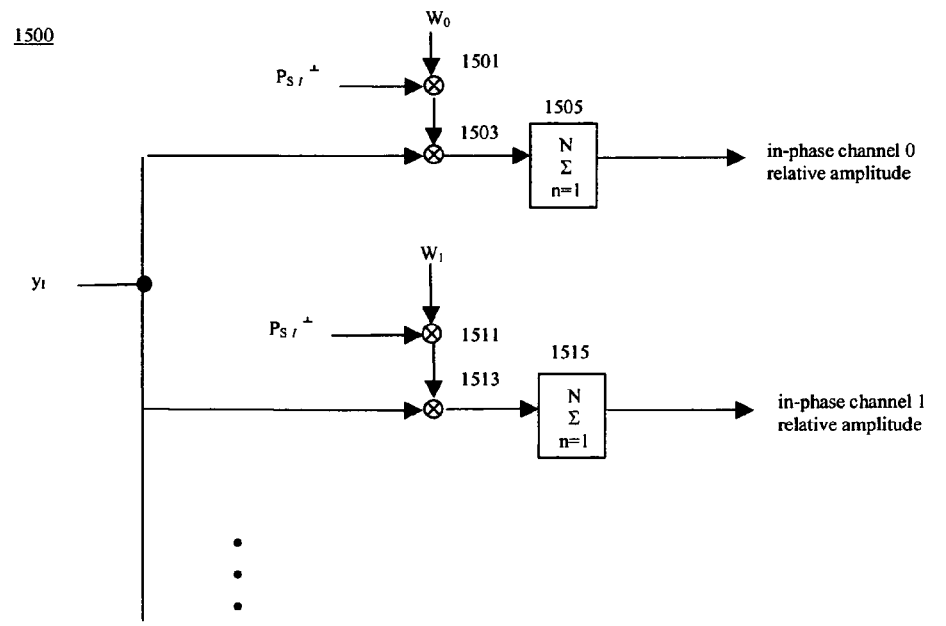
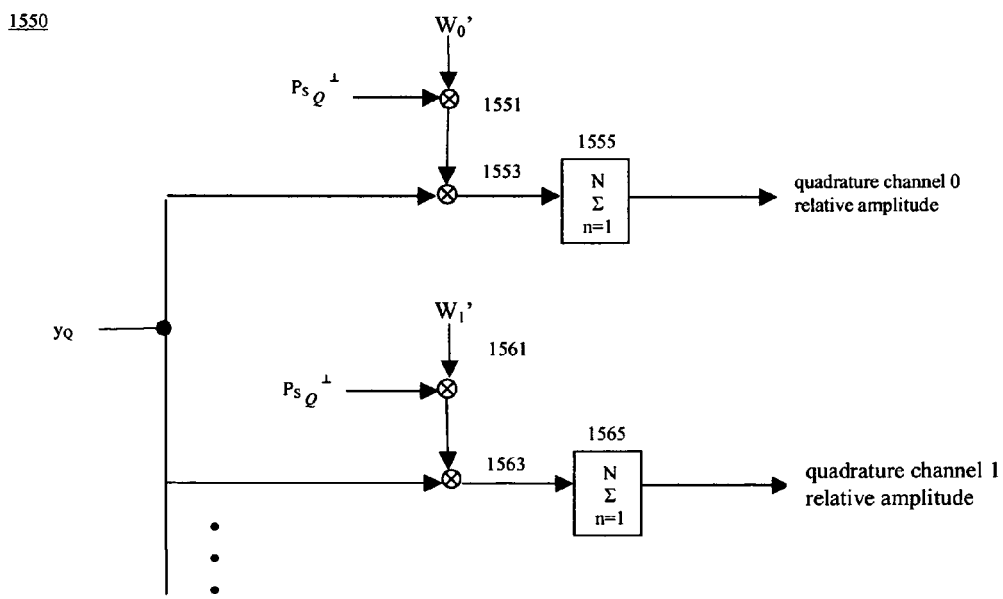

CDMA2000 Generation of S Matrices

No Information:

CDMA2000 Generation of S Matrices

Sign information:

CDMA2000 Generation of S Matrices

Composite: Relative Amplitude Information

SERIAL CANCELLATION RECEIVER DESIGN FOR A CODED SIGNAL PROCESSING ENGINE

CROSS-REFERENCE TO RELATED APPLICATIONS

This application is a divisional of U.S. patent application Ser. No. 10/247,836, filed Sep. 20, 2002, now U.S. Pat. No. 7,158,559 which claims priority to U.S. Provisional Patent Application No. 60/354,093, entitled "A Parallel CSPE Based Receiver for Communication Signal Processing," filed Feb. 5, 2002; U.S. patent application Ser. No. 10/178,541, entitled "Method and Apparatus to Compute the Geolocation of a Communication Device Using Orthogonal Projections," filed Jun. 25, 2002; U.S. Provisional Patent Application No. 60/348,106, entitled "Serial Receiver Design for a Coded Signal Processing Engine," filed Jan. 14, 2002; U.S. Provisional Patent Application No. 60/333,143, entitled "Method and Apparatus to Compute the Geolocation of a Communication Device Using Orthogonal Projection Methods," filed Nov. 27, 2001; U.S. Provisional Patent Application No. 60/331,480, entitled "Construction of an Interference Matrix for a Coded Signal Processing Engine," filed Nov. 16, 2001; U.S. Provisional Patent Application No. 60/326,199, entitled "Interference Cancellation in a Signal," filed Oct. 2, 2001; and U.S. Provisional Patent Application No. 60/325,215, entitled "An Apparatus for Implementing Projections in Signal Processing Applications," filed Sep. 28, 2001; the entire disclosure and contents of these applications are hereby incorporated by reference. This application also incorporates by reference U.S. patent application Ser. No. 09/988,218, entitled "Interference Cancellation In a Signal," filed Nov. 19, 2001, now U.S. Pat. No. 6,711,219; U.S. Provisional Patent Application No. 60/251,432, entitled "Architecture for Acquiring, Tracking and Demodulating Pseudorandom Coded Signals in the Presence of Interference," filed Dec. 4, 2000; U.S. patent application Ser. No. 09/988,219, entitled "A Method and Apparatus for Implementing Projections in Signal Processing Applications," filed Nov. 19, 2001, now U.S. Pat. No. 6,856,945; U.S. patent application Ser. No. 09/612,602, filed Jul. 7, 2000, now U.S. Pat. No. 6,430,216; and U.S. patent application Ser. No. 09/137,183, filed Aug. 20, 1998.

BACKGROUND OF THE INVENTION

1. Field of the Invention

The present invention relates generally to a serial cancellation architecture for a Coded Signal Processing Engine (CSPE) that is designed for interference cancellation in the reception of coded signals in a spread spectrum system. More specifically, the CSPE may be used in a cascading sense for successive acquisition, tracking and demodulation of pseudorandom (PN) coded signals in the presence of interference in a CDMA system.

2. Description of the Prior Art

In spread spectrum systems, whether it is a wireless communication system, a Global Positioning System (GPS) or a radar system, each transmitter may be assigned a unique code and in many instances each transmission from a transmitter is assigned a unique code. The code is nothing more than a sequence (often pseudorandom) of bits. Examples of codes include Gold codes (used in GPS—see Kaplan, Elliot D., Editor, *Understanding GPS: Principles and Applications*, Artech House 1996), Barker codes (used in radar—see Stimson, G. W., "*An Introduction to Airborne Radar*", SciTech Publishing Inc., 1998) and Walsh codes (used in communications systems, such as cdmaOne—See IS-95). These codes may be used to spread the signal so that the resulting signal occupies some specified range of frequencies in the electromagnetic spectrum or the codes may be superimposed on another signal, which may also be a coded signal.

Assigning a unique code to each transmitter allows the receiver to distinguish between different transmitters. An example of a spread spectrum system that uses unique codes to distinguish between transmitters is a GPS system.

If a single transmitter has to broadcast different messages to different receivers, such as a base station in a wireless communication system broadcasting to multiple mobiles, one may use codes to distinguish between messages for each mobile. In this scenario, each symbol for a particular user is encoded using the code assigned to that user. By coding in this manner, the receiver, by knowing its own code, may decipher the message intended for it from the superposition of message signals received.

In some communication systems, a symbol is assigned to a sequence of bits that comprise a message. For example, a long digital message may be grouped into sets of M bit sequences where each unique sequence is assigned a symbol. For example, if M=6, then each set of 6 bits may assume one of $2^6$=64 possibilities. Such a system would broadcast a waveform, called a symbol, which would represent a sequence of transmitted bits. For example, the symbol $\alpha$ might denote the sequence 101101 and the symbol $\beta$ might denote the sequence 110010. In the spread spectrum version of such a system, these symbols are codes. An example of such a communication system is the mobile to base station (forward/down) link of cdmaOne.

In some instances, such as in a coded radar system, each pulse is assigned a unique code so that the receiver is able to distinguish between different pulses by the codes.

Of course, all of these techniques may be combined to distinguish between transmitters, messages, pulses and symbols in a single system. The key idea in all of these coded systems is that the receiver knows the code(s) of the message intended for it. By applying the code(s) correctly to the received signal, the receiver may extract the message for which it is intended. However, such receivers are more complex than receivers that distinguish between messages by time and/or frequency alone. Complexity arises because the signal received is a linear combination of all the coded signals present in the spectrum of interest at any given time. The receiver must be able to extract the message intended for it from this linear combination of coded signals.

The following section presents the problem of interference in linear algebraic terms and provides a method by which it may be cancelled.

Let H be a matrix containing the spread signal from source number 1 and let $\theta_1$ be the amplitude of the signal from this source. Let $s_i$ be the spread signals for the remaining sources and let $\phi_i$ be the corresponding amplitudes. Suppose that the receiver is interested in source number 1. The signals from the other sources may be considered to be interference. The received signal is:

$$y = H\theta_1 + s_2\phi_2 + s_3\phi_3 + \ldots + s_p\phi_p + n \quad (1)$$

where n is the additive noise term, and p is the number of sources in the CDMA system. Let the length of the vector y be N, where N is the number of points in the integration window. The value of N is selected as part of the design process and is a trade-off between processing gain and complexity. N consecutive points of y will be referred to as a segment.

In a wireless communication system, the columns of the matrix H represent the various coded signals of interest and the elements of the vector $\theta$ are the amplitudes of the respective coded signals. For example, in the base station to mobile link of a cdmaOne system, the coded signals may include the various channels, i.e. pilot, paging, synchronization and traffic, of each base station's line-of-sight (LOS) or multipath fingers. In the mobile to base station link, the columns of the matrix H may be the coded signals from a mobile LOS or one of its multipath signals.

In a GPS system, the columns of the matrix H are the coded signals of interest broadcast by the GPS satellites.

In an array application, the columns of the matrix are steering vectors, or equivalent array pattern vectors. These vectors characterize the relative phase recorded by each antenna in the array as a function of the location and motion dynamics of the source as well as the arrangement of the antennas in the array. In the model presented above, each column of the matrix H signifies a steering vector corresponding to a particular source.

Equation (1) may be written in the following matrix form:

$$y = H\theta + S\phi + n \quad (2)$$
$$= [HS]\begin{bmatrix}\theta\\\phi\end{bmatrix} + n$$

where
H: spread signal matrix of the source of interest,
$\theta$: amplitude vector of the source of interest,
$S=[s_2 \ldots s_p]$: spread signal matrix of all the other sources, i.e., the interference, and
$\phi=[\phi_2 \ldots \phi_p]$: interference amplitude vector.

Receivers that are currently in use correlate the measurement, y, with a replica of H to determine if H is present in the measurement. If H is detected, then the receiver knows the bit-stream transmitted by source number 1. Mathematically, this correlation operation is:

$$\text{correlation function} = (H^T H)^{-1} H^T y \quad (3)$$

where $^T$ is the transpose operation.

Substituting for y from equation (2) illustrates the source of the power control requirement:

$$(H^T H)^{-1} H^T y = (H^T H)^{-1} H^T (H\theta + S\phi + n) \quad (4)$$
$$= (H^T H)^{-1} H^T H\theta + (H^T H)^{-1} H^T S\phi + (H^T H)^{-1} H^T n$$
$$= \theta + (H^T H)^{-1} H^T S\phi + (H^T H)^{-1} H^T n$$

The middle term, $(H^T H)^{-1} H^T S\phi$, in the above equation is the source of the near-far problem. If the codes are orthogonal, then this term reduces to zero, which implies that the receiver has to detect $\theta$ in the presence of noise, i.e. $(H^T H)^{-1} H^T n$ only. As the amplitudes of the other sources increase, the term $(H^T H)^{-1} H^T S\phi$ contributes a significant amount to the correlation, which makes the detection of $\theta$ more difficult.

The normalized correlation function, $(H^T H)^{-1} H^T$, defined above, is in fact a matched filter and is based on an orthogonal projection of y onto the space spanned by H. When H and S are not orthogonal to each other, there is leakage of the components of S into the orthogonal projection of y onto H. This leakage is geometrically illustrated in FIG. 1. Note in FIG. 1, that if S were orthogonal to H, the leakage component is zero as is evident from equation 4. The CSPE provides a solution to this interference leakage issue.

One way to mitigate this interference is to remove the interference in y by means of a projection operation. Mathematically, a projection onto the space spanned by the columns of the matrix S is given by:

$$P_s = S(S^T S)^{-1} S^T \quad (5)$$

A projection onto the space perpendicular to the space spanned by the columns of S is obtained by subtracting the above projection $P_s$ from the identity matrix (a matrix with ones on the diagonal and zeros everywhere else). Mathematically, this projection is represented by:

$$P_s^\perp = I - P_s = I - S(S^T S)^{-1} S^T \quad (6)$$

The projection matrix $P_s^\perp$ has the property that when it is applied to a signal of type $S\phi$, i.e., a signal that lies in the space spanned by the columns of S, it completely removes $S\phi$ no matter what the value of $\phi$. Namely, the projection is magnitude independent. This interference cancellation operation is illustrated in equation 7:

$$P_s^\perp (S\phi) = (I - S(S^T S)^{-1} S^T) S\phi = S\phi - S(S^T S)^{-1} S^T S\phi = S\phi - S\phi = 0 \quad (7)$$

When applied to the measurement vector y, it cancels the interference terms:

$$P_s^\perp y = P_s^\perp (H\theta + S\phi + n) = P_s^\perp H\theta + P_s^\perp S\phi + P_s^\perp n = P_s^\perp H\theta + P_s^\perp n \quad (8)$$

Detection of the signal interest may then proceed with the processed measurement vector $P_s^\perp y$ with the interference signal(s) S removed.

This method of projections and interference cancellation may be incorporated as an improvement to the baseline receiver for spread spectrum signal reception.

The present invention is a receiver with improved correlation properties that makes use of the principle of orthogonal projections as described in the patent applications identified and incorporated by reference above.

SUMMARY OF THE INVENTION

It is therefore an object of the present invention to provide a novel serial cancellation receiver architecture for the Coded Signal Processing Engine (CSPE).

It is a further object to provide an apparatus by which PN coded signals may be successively acquired, tracked, demodulated and cancelled in a cascading sense.

It is yet another object to provide an apparatus by which signals buried by interference may be successively detected through repeated serial cancellations.

In all of the above embodiments, it is an object to provide a method for interference cancellation in the reception of PN coded signals.

According to a first broad aspect of the present invention, there is provided anarchitecture for implementing a forward link serial cancellation CSPE receiver for cdmaOne.

According to second broad aspect of the invention, there is provided anarchitecture for implementing a forward link serial cancellation CSPE receiver for cdma2000.

In a preferred embodiment, a serial receiver for a wireless communication system is provided, the communication system comprising: a means for receiving a signal y having data parameters; a control processor; the control processor for receiving the signal y and the data parameters; at least two fingers, the control processor for determining which of the data parameters are sent to respective fingers, wherein one finger is a search finger and at least one finger is a tracking finger; and wherein the tracking finger comprises a correlator and a Coded Signal Processing Engine (CSPE), the CSPE for interference cancellation in the reception of the signal y.

In another embodiment, a serial receiver for a wireless communication system is provided, the communication system comprising: a means for receiving a signal y having data parameters; a control processor; the control processor for receiving the signal y and the data parameters; at least two fingers, the control processor for determining which data parameters are sent to respective fingers, wherein one finger is a search finger and at least one finger is a tracking finger; wherein the tracking finger comprises a correlator and a Coded Signal Processing Engine (CSPE), the CSPE for interference cancellation in the reception of the measured signal; wherein the CSPE comprises: an apparatus for generating a projection from a received signal (y), the signal comprising $s_i$, a signal of the source of interest; $s_1$, $s_2$, $s_3$ ..., $s_p$ signals of other interfering sources; and noise (n); the apparatus comprising: means for determining a basis vector U; means for storing elements of the basis vector U; means for determining $y_{perp}$ where: $y_{perp} = y - U(U^T U)^{-1} U^T y$; and wherein the search finger receives an input from the control processor, the input being selected from the group consisting of: $y^{(k)}$, a data stream in which k interference signals have been removed; and $$\prod_{i,j} P^\perp_{s_i(j)},$$

a product of projection operators used to remove the k interference signals.

In another embodiment, a serial receiver for a wireless communication system is provided, the communication system comprising: a means for receiving a signal y having data parameters; a control processor; the control processor for receiving the signal y and the data parameters; at least two fingers, the control processor for determining which of the data parameters are sent to respective fingers, wherein one finger is a search finger and at least one finger is a tracking finger; wherein the tracking finger comprises a correlator and a Coded Signal Processing Engine (CSPE), the CSPE for interference cancellation in the reception of the measured signal; wherein the CSPE comprises: an apparatus for generating a projection from a received signal (y), the signal comprising $s_i$, a spread signal matrix of the source of interest; $s_1, s_2, s_3 \ldots, s_p$, signals of other interfering sources; and noise (n); the apparatus comprising: (A) means for assigning $s_1$ as a first basis vector $u_1$; (B) means for determining $\sigma_i$, where $u_i^T u_i = \sigma_i$; (C) means for storing $u_i$; (D) means for computing inner products of the $s_{i+1}$ and the $u_1$ through $u_i$ vectors; (E) means for multiplying the inner products with a respective scalar $1/\sigma_i$ and thereby creating a first intermediate product; (F) means for scaling each respective basis vector $u_i$ by multiplying each respective first intermediate product with each respective basis vector $u_i$; (G) means for serially subtracting the intermediate product from $s_{i+1}$; (H) means for utilizing the result from step G and subtracting the next incoming value of $$u_i \frac{1}{\sigma_i} u_i^T s_{i+1}$$

until all the values are processed; (I) means for obtaining the next basis vector $u_{i+1}$ from step H; (J) means for comparing $u_{i+1}$ to a predetermined value and if equal to or less than the value, going to step O; (K) means for storing $u_{i+1}$; (L) means for determining an inner product of $u^T_{i+1} u_{i+1}$; (M) means for determining the reciprocal of step K which is $1/\sigma_{i+1}$; (N) means for storing $1/\sigma_{i+1}$; (O) means for incrementing i; (P) means for conducting steps D through O until i=p, where p is the total number of the sources of interest; (Q) and means for determining $y_{perp}$ where: $y_{perp} = y - U(U^T U)^{-1} U^T y$; and wherein the search finger receives an input from the control processor, the input being selected from the group consisting of: $y^{(k)}$, a data stream in which k interference signals have been removed; and $$\prod_{i,j} P^\perp_{s_i(j)},$$

a product of projection operators used to remove the k interference signals.

In another embodiment, a serial receiver for a wireless communication system is provided, the communication system comprising: a means for receiving a signal y having data parameters; a control processor; the control processor for receiving the signal y and the data parameters; at least two fingers, the control processor for determining which of the data parameters are sent to respective fingers, wherein one finger is a search finger and at least one finger is a tracking finger; wherein the tracking finger comprises a correlator and a Coded Signal Processing Engine (CSPE), the CSPE for interference cancellation in the reception of the measured signal; wherein the CSPE comprises: an apparatus for generating a projection from a received signal (y), the signal comprising $s_i$, a signal of the source of interest; $s_1$, $s_2$, $s_3$ ..., $s_p$, signals of other sources; and noise (n); the apparatus comprising: means for determining a basis vector U; means for storing elements of the basis vector U; means for determining $y_{perp}$ where: $y_{perp} = y - U(U^T U)^{-1} U^T y$; and wherein the search finger receives an input from the control processor, the input being selected from the group consisting of: $y^{(k)}$, a data stream in which k interference signals have been removed; and $$\prod_{i,j} P^\perp_{s_i(j)},$$

a product of a projection operator used to remove the k interference signals.

In another embodiment, a serial receiver for a wireless communication system is provided, the communication system comprising: a means for receiving a signal y having data parameters; a control processor; the control processor for receiving the signal y and the data parameters; at least two fingers, the control processor for determining which of the data parameters are sent to respective fingers, wherein one finger is a search finger and at least one finger is a tracking finger; wherein the tracking finger comprises a correlator and a Coded Signal Processing Engine (CSPE), the CSPE for interference cancellation in the reception of the signal y; and wherein the tracking finger further comprises a tracking loop and a means for signal demodulation.

In another embodiment, a modified Hadamard transform module is provided, the module comprising: an input signal y; means for splitting the input signal into a plurality of input channels; a plurality of relative amplitude generation channels, one associated with each of the input channels, wherein at least one of the relative amplitude generation channels comprises a respective Walsh code which is multiplied by a projection matrix $P_s^{195}$ and the signal y to generate a respective intermediate channel signal; and a summer for summing the respective intermediate channel signal over a Walsh symbol to generate the respective channel's amplitude.

In another embodiment, a method for generating an S matrix is provided, the method comprising the steps of:
  A. Receiving a plurality of input signals $W_1$ through $W_n$, where n represents the number of input signals;
  B. Determining which input signals will be utilized in the generation of matrix S;
  C. Multiplying each selected input signal with a projection matrix $P_s^\perp$ to generate a column of matrix S; and
  D. Storing each respective column to form matrix S.

In another embodiment, an apparatus for generating an S matrix is provided, the apparatus comprising: a means for receiving a plurality of input signals $W_1$ through $W_n$, where n represents the number of input signals; a means for determining which input signals will be utilized in the generation of matrix S; a means for multiplying each selected input signal with a projection matrix $P_s^\perp$ to generate a column of matrix S; and means for storing each respective column to form matrix S.

In another embodiment, a method for generating an S matrix is provided, the method comprising the steps of:
  A. Receiving a plurality of input signals $W_1$ through $W_n$, where n represents the number of input signals;
  B. Determining which input signals will be utilized in the generation of matrix S;
  C. Multiplying each selected input signal with a projection matrix $P_s^\perp$ to generate an intermediate signal;
  D. Utilizing relative amplitude information associated with the selected input signals to determine the sign of the selected input signal;
  E. Multiplying the intermediate signal with its associated sign to generate a column of matrix S; and
  F. Storing each respective column to form matrix S.

In another embodiment, an apparatus for generating an S matrix is provided, the apparatus comprising: a means for receiving a plurality of input signals $W_1$ through $W_n$, where n represents the number of input signals; a means for determining which input signals will be utilized in the generation of matrix S; a first means for multiplying each selected input signal with a projection matrix $P_s^\perp$ to generate an intermediate signal; a means for utilizing relative amplitude information associated with the input signals to determine the sign of the input signal; a second means for multiplying the intermediate signal with its associated sign to generate a column of matrix S; and means for storing each respective column to form matrix S.

In another embodiment, a method for generating an S matrix is provided, the method comprising the steps of:
  A. Receiving a plurality of input signals $W_1$ through $W_n$, where n represents the number of input signals;
  B. Determining which input signals will be utilized in the generation of matrix S;
  C. Multiplying each selected input signal with a projection matrix $P_s^\perp$ to generate an intermediate signal;
  D. Determining relative amplitude associated with the selected input signals;
  E. Multiplying the intermediate signal with its associated relative amplitude to generate a column of matrix S; and
  F. Storing each respective column to form matrix S.

In another embodiment, an apparatus for generating an S matrix is provided, the apparatus comprising: a means for receiving a plurality of input signals $W_1$ through $W_n$, where n represents the number of input signals; a means for determining which input signals will be utilized in the generation of matrix S; a first means for multiplying each selected input signal with a projection matrix $P_s^\perp$ to generate an intermediate signal; a means for determining relative amplitude associated with the respective input signal; a second means for multiplying the intermediate signal with its associated relative amplitude to generate a column of matrix S; and means for storing each respective column to form matrix S.

In another embodiment, a method for generating an S matrix is provided, the method comprising the steps of:
  A. Receiving a plurality of input signals $W_1$ through $W_n$, where n represents the number of input signals;
  B. Determining which input signals will be utilized in the generation of matrix S;
  C. Multiplying each selected input signal with a projection matrix $P_s^\perp$ to generate an intermediate signal;
  D. Determining relative amplitude associated with the selected input signals;
  E. Multiplying the intermediate signal with its associated relative amplitude to generate an intermediate column;
  F. Summing all intermediate columns to generate a column of matrix S; and
  G. Storing each respective column of matrix S to form matrix S.

In another embodiment, an apparatus for generating an S matrix is provided, the apparatus comprising: a means for receiving a plurality of input signals $W_1$ through $W_n$, where n represents the number of input signals; a means for determining which input signals will be utilized in the generation of matrix S; a first means for multiplying each selected input signal with a projection matrix $P_s^\perp$ to generate a column of matrix S and an intermediate signal; means for determining relative amplitude associated with the selected input signals; second means for multiplying the intermediate signal with its associated relative amplitude to generate an intermediate column; means for summing all intermediate columns to generate a column of matrix S; and means for storing each respective column of matrix S to form matrix S.

In another embodiment, a modified Hadamard transform module is provided, the module comprising: an input signal y, the signal having an in-phase component ($y_i$) and a quadrature component ($y_Q$); means for splitting the in-phase component ($y_i$) into a first plurality of input channels; a first plurality of relative amplitude generation channels, one associated with each of the first input channels, wherein at least one of the relative amplitude generation channels comprises a respective Walsh code which is multiplied by a projection matrix $P_{s_I}^\perp$ and the in-phase component ($y_i$) to generate a respective first intermediate channel signal; a first summer for summing the respective first intermediate channel signal over a Walsh symbol to generate the respective channel's amplitude; means for splitting the quadrature component ($y_Q$) into a second plurality of input channels; a second plurality of relative amplitude generation channels, one associated with each of the second input channels, wherein at least one of the relative amplitude generation channels comprises a respective Walsh code which is multiplied by a projection matrix $P_{s_Q}^{\perp}$ and the quadrature component ($y_Q$) to generate a respective second intermediate channel signal; and a second summer for summing the respective second intermediate channel signal over a Walsh symbol to generate the respective channel's amplitude.

In another embodiment, a method for generating an S matrix is provided, the S matrix having an in-phase and a quadrature component, the method comprising the steps of:

A. Receiving a plurality of input signals $W_1$ through $W_n$, where n represents the number of input signals and where each input signal W has an in-phase component ($W_I$) and a quadrature component ($W_Q$);

B. Determining which in-phase components of the input signals will be utilized in the generation of matrix $S_I$;

C. Multiplying each in-phase component of the selected input signal with a projection matrix $P_{s_I}^{\perp}$ to generate a column of matrix $S_I$;

D. Storing each respective column to form matrix $S_I$;

E. Determining which quadrature components of the input signals will be utilized in the generation of matrix $S_Q$;

F. Multiplying each quadrature component of the selected input signal with a projection matrix $P_{s_Q}^{\perp}$ to generate a column of matrix $S_Q$; and G. Storing each respective column to form matrix $S_Q$.

In another embodiment, an apparatus for generating an S matrix is provided, the S matrix having an in-phase and a quadrature component, the apparatus comprising: a means for receiving a plurality of input signals $W_1$ through $W_n$, where n represents the number of input signals and where each input signal W has an in-phase component ($W_I$) and a quadrature component ($W_Q$); a means for determining which in-phase components of the input signals will be utilized in the generation of matrix $S_I$; a first means for multiplying each in-phase component of the selected input signal with a projection matrix $P_{s_I}^{\perp}$ to generate a column of matrix $S_I$; means for storing each respective column to form matrix $S_I$; a means for determining which quadrature components of the input signals will be utilized in the generation of matrix $S_Q$; a second means for multiplying each quadrature component of the selected input signal with a projection matrix $P_{s_Q}^{\perp}$ to generate a column of matrix $S_Q$; and means for storing each respective column to form matrix $S_Q$.

In another embodiment, a method for generating an S matrix is provided, the S matrix having an in-phase and a quadrature component, the method comprising the steps of:

A. Receiving a plurality of input signals $W_1$ through $W_n$, where n represents the number of input signals and where each input signal W has an in-phase component ($W_I$) and a quadrature component ($W_Q$);

B. Determining which in-phase components of the input signals will be utilized in the generation of matrix $S_I$;

C. Multiplying each in-phase component of the selected input signal with a projection matrix $P_{s_I}^{\perp}$ to generate an in-phase intermediate signal;

D. Utilizing relative amplitude information associated with the in-phase component of the selected input signals to determine the sign of the selected in-phase component of the input signal;

E. Multiplying the in-phase intermediate signal with its associated sign to generate a column of matrix $S_I$;

F. Storing each respective column to form matrix $S_I$;

G. Determining which quadrature components of the input signals will be utilized in the generation of matrix $S_Q$;

H. Multiplying each quadrature component of the selected input signal with a projection matrix $P_{s_Q}^{\perp}$ to generate a quadrature intermediate signal;

I. Utilizing relative amplitude information associated with the quadrature component of the selected input signals to determine the sign of the selected quadrature component of the input signal;

J. Multiplying the quadrature intermediate signal with its associated sign to generate a column of matrix $S_Q$; and K. Storing each respective column to form matrix $S_Q$.

In another embodiment, an apparatus for generating an S matrix is provided, the S matrix having an in-phase and a quadrature component, the apparatus comprising: means for receiving a plurality of input signals $W_1$ through $W_n$, where n represents the number of input signals and where each input signal W has an in-phase component ($W_I$) and a quadrature component ($W_Q$); a means for determining which in-phase components of the input signals will be utilized in the generation of matrix $S_I$ and $S_Q$; a first means for multiplying each in-phase component of the selected input signal with a projection matrix $P_{s_I}^{\perp}$ to generate an in-phase intermediate signal; a means for utilizing relative amplitude information associated with the in-phase component of the input signals to determine the sign of the in-phase component of the input signal; a second means for multiplying the in-phase intermediate signal with its associated sign to generate a column of matrix $S_I$; means for storing each respective column to form matrix $S_I$; a third means for multiplying each quadrature component of the selected input signal with a projection matrix $P_{s_Q}^{\perp}$ to generate a quadrature intermediate signal; a means for utilizing relative amplitude information associated with the quadrature component of the input signals to determine the sign of the quadrature component of the input signal; a fourth means for multiplying the quadrature intermediate signal with its associated sign to generate a column of matrix $S_Q$; and means for storing each respective column to form matrix $S_Q$.

In another embodiment, a method for generating an S matrix is provided, the S matrix having an in-phase and a quadrature component, the method comprising the steps of:

A. Receiving a plurality of input signals $W_1$ through $W_n$, where n represents the number of input signals and where each input signal W has an in-phase component ($W_I$) and a quadrature component ($W_Q$);

B. Determining which input signals will be utilized in the generation of matrix $S_I$;

C. Multiplying each in-phase component of the selected input signal with a projection matrix $P_{s_I}^{\perp}$ to generate an in-phase intermediate signal;

D. Determining relative amplitude associated with the in-phase component of the selected input signals;

E. Multiplying the in-phase intermediate signal with its associated relative amplitude to generate a column of matrix $S_I$;

F. Summing each column of matrix $S_I$ to generate a composite column;

G. Storing the composite column to form matrix $S_I$;

H. Determining which input signals will be utilized in the generation of matrix $S_Q$;

I. Multiplying each quadrature component of the selected input signal with a projection matrix $P_{s_Q}^{\perp}$ to generate a quadrature intermediate signal;

J. Determining relative amplitude associated with the quadrature component of the selected input signals;

K. Multiplying the quadrature intermediate signal with its associated relative amplitude to generate a column of matrix $S_Q$;

L. Summing each column of matrix $S_Q$ to generate a composite column; and

M. Storing the composite column to form matrix $S_Q$.

In another embodiment, an apparatus for generating an S matrix is provided, the S matrix having an in-phase and a quadrature component, the apparatus comprising: a means for receiving a plurality of input signals $W_1$ through $W_n$, where n represents the number of input signals and where each input signal W has an in-phase component ($W_i$) and a quadrature component ($W_Q$); a means for determining which input signals will be utilized in the generation of matrix $S_I$ and $S_Q$; a first means for multiplying each in-phase component of the selected input signal with a projection matrix $P_{s_I}^\perp$ to generate an in-phase intermediate signal; a means for determining relative amplitude associated with the in-phase component of the respective input signal; a second means for multiplying the in-phase intermediate signal with its associated relative amplitude to generate a column of matrix $S_I$; first means for summing each column of matrix $S_I$ to generate a first composite column; first means for storing the first composite column to form matrix $S_I$; a third means for multiplying each quadrature component of the selected input signal with a projection matrix $P_{s_Q}^\perp$ to generate a quadrature intermediate signal; a means for determining relative amplitude associated with the quadrature component of the respective input signal; a fourth means for multiplying the quadrature intermediate signal with its associated relative amplitude to generate a column of matrix $S_Q$; means for summing each column of matrix $S_Q$ to generate a second composite column; and means for storing the second composite column to form matrix $S_Q$.

In another embodiment, a method for generating an S matrix is provided, the method comprising the steps of:

A. Receiving a plurality of input signals $W_1$ through $W_n$, where n represents the number of input signals;

B. Determining which input signals will be utilized in the generation of matrix S;

C. Multiplying each of the selected input signals with a projection matrix $P_s^\perp$ to generate an intermediate signal;

D. Determining relative amplitude associated with the component of the selected input signals;

E. Multiplying the intermediate signal with its associated relative amplitude to generate a column of matrix S;

F. Summing each column of matrix S to generate a composite column; and

G. Storing the composite column to form matrix S.

Other objects and features of the present invention will be apparent from the following detailed description of the preferred embodiment.

BRIEF DESCRIPTION OF THE DRAWINGS

The invention will be described in conjunction with the accompanying drawings, in which:

FIG. 15 is a block diagram depicting an amplitude estimator module for the receiver illustrated in FIG. 5 and utilized in a cdma2000 system;

DETAILED DESCRIPTION OF THE PREFERRED EMBODIMENT

Figure 1:
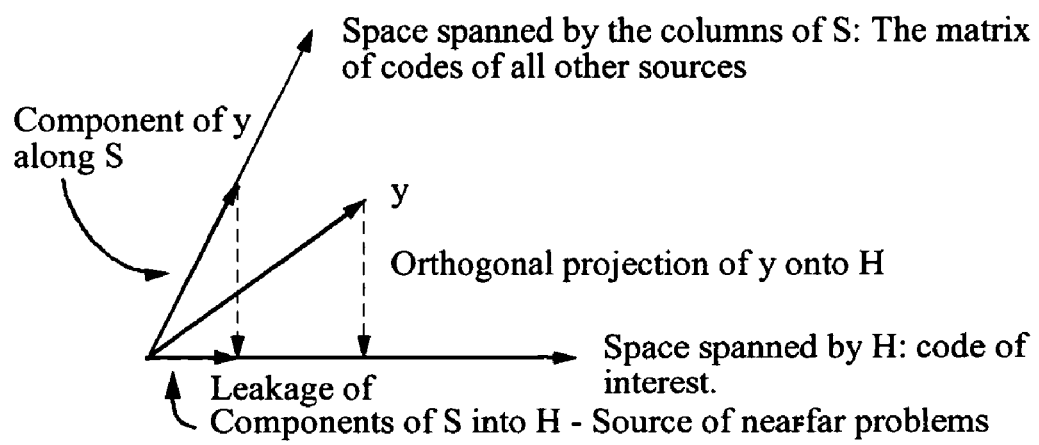
FIG. 1 is a depiction of leakage due to orthogonal projections of non-orthogonal signal spaces in prior art signal-processing.

It is advantageous to define several terms before describing the invention. It should be appreciated that the following definitions are used throughout this application. Where the definition of terms departs from the commonly used meaning of the term, applicant intends to utilize the definitions provided below, unless specifically indicated.

DEFINITIONS

For the purposes of the present invention, the term "cross-channel interference" refers to the type of interference that results from one source's signals bleeding into the acquisition and tracking channels of another source.

For the purposes of the present invention, the term "co-channel interference" refers to the type of interference that occurs when one or more signals, e.g., a line-of-sight signal; interferes with the ability to acquire a second, third or other multipath signal from the same source.

For the purposes of the present invention, the term "finger" refers to either an LOS or multipath copy of a signal from any source. It may consist of multiple channels. For example, an IS-95 multipath finger may consist of the pilot, paging, synchronization and a number of traffic channels.

For the purposes of the present invention, the term "multipath finger" refers specifically to either an LOS or multipath signal from a single source. It may consist of multiple channels. For example, an IS-95 multipath finger may consist of the pilot, paging, synchronization and a number of traffic channels.

For the purposes of the present invention, the term "processing finger" refers to a signal-processing element in a receiver that tracks a single multipath finger and processes a single channel contained in a multipath finger. For example, in an IS-95 mobile receiver, each processing finger tracks a single multipath finger of a channel.

For the purposes of the present invention, the term "analog" refers to any measurable quantity that is continuous in nature.

For the purposes of the present invention, the term "base station" refers to a transmitter and/or receiver that is capable of communicating with multiple mobile units in a wireless environment.

For the purposes of the present invention, the term "baseline receiver" refers to a conventional CDMA receiver against which a receiver of the present invention may be compared.

For the purposes of the present invention, the term "baseline finger processor" refers to a processing finger in a baseline receiver that tracks a finger.

For the purposes of the present invention, the term "bit" refers to the conventional meaning of "bit," i.e., a fundamental unit of information having one of two possible values; a binary 1 or 0.

For the purposes of the present invention, the term "chip" refers to a non-information bearing unit that is smaller than a bit, the fundamental information bearing unit. Use of spreading codes produce fixed length sequences of chips that constitute bit(s).

For the purposes of the present invention the term "code" refers to a specified sequence of numbers that is applied to a message and is known by the intended recipient of the message.

For the purposes of the present invention the term "Code-Division Multiple Access (CDMA)" refers to a method for multiple access in which all users share the same spectrum but are distinguishable from each other by a unique code.

For the purposes of the present invention, the term "code offset" refers to a location within a code. For example, base stations in certain wireless environments distinguish between each other by their location within a code, often a pseudorandom sequence.

For the purposes of the present invention, the term "correlation" refers to the inner product between two signals, typically scaled by the length of the signals or by another normalization factor. Correlation provides a measure of how alike two signals are.

For the purposes of the present invention, the term "digital" refers to the conventional meaning of the term digital, i.e., relating to a measurable quantity that is discrete in nature.

For the purposes of the present invention, the term "Doppler" refers to the conventional meaning of the term Doppler, i.e., a shift in frequency that occurs due to movement of a receiver, transmitter and/or background.

For the purposes of the present invention, the term "Global Positioning System (GPS)" refers to the conventional meaning of this term, i.e., a satellite-based system for position location.

For the purposes of the present invention, the term "in-phase" refers to the component of a signal that is aligned in phase with a particular signal, such as a reference signal.

For the purposes of the present invention, the term "quadrature" refers to the component of a signal that is 90° out of phase with a particular signal, such as a reference signal.

For the purposes of the present invention, the term "interference" refers to the conventional meaning of the term interference, i.e., a signal that is not of interest but that interferes with the ability to detect the signal of interest. Generally, interference is structured noise that is created by other processes that are attempting to do the same thing as the signal of interest, e.g., other base stations communicating with mobiles, or multipath versions of the signal of interest.

For the purposes of the present invention, the term "linear combination" refers to the combining of multiple signals or mathematical quantities in an additive way with nonzero scaling of the individual signals.

For the purposes of the present invention, the term "matched filter" refers to a filter that is designed to facilitate the detection of a known signal by effectively correlating the received signal with an uncorrupted replica of the known signal.

For the purposes of the present invention, the term "noise" refers to the conventional meaning of noise with respect to the transmission and reception of signals, i.e., a random disturbance that limits the ability to detect a signal of interest. Specifically, it refers to processes that are attempting to do something different than the signal of interest. Additive noise adds linearly with the power of the signal of interest. Examples of noise in cellular systems may include automobile ignitions, power lines and microwave communication links.

For the purpose of the present invention, the term "matrix inverse" refers to the inverse of a square matrix S, denoted by $S^{-1}$, that is defined as that matrix which when multiplied by the original matrix equals the identity matrix, I, i.e., a matrix which is all zero save for a diagonal of all ones.

For the purposes of the present invention, the term "mobile" refers to a mobile phone which functions as a transmitter or receiver and communicates with base stations.

For the purposes of the present invention, the term "modulation" refers to imparting information on another signal, such as a sinusoidal signal or a pseudorandom coded signal. Typically, this is accomplished by manipulating signal parameters, such as phase, amplitude, frequency or some combination of these quantities.

For the purposes of the present invention, the term "multipath" refers to copies of a signal that travel different paths to the receiver.

For the purposes of the present invention, the term "normalization" refers to a scaling relative to another quantity.

For the purposes of the present invention, two nonzero vectors, $e_1$ and $e_2$ are said to be "orthogonal" if their inner product (defined as $e_1^T e_2$, where $^T$ refers to the transpose operator) is identically zero. Geometrically, this refers to vectors that are perpendicular to each other.

For the purposes of the present invention, the term "pseudorandom number (PN)" sequences refer to sequences that are often used in spread spectrum applications as codes to distinguish between users while spreading the signal in the frequency domain.

For the purposes of the present invention, the term "processing gain" refers to the ratio of signal to noise ratio (SNR) of the processed signal to the SNR of the unprocessed signal.

For the purposes of the present invention, the term "projection", with respect to any two vectors x and y, refers to the projection of the vector x onto y in the direction of a y with a length equal to that of the component of x, which lies in the y direction.

For the purposes of the present invention, the term "quasi-orthogonal functions (QOF)" refers to a set of orthogonal functions used in cdma2000. QOFs are orthogonal within a set, but between different QOF sets and Walsh codes there exists non-zero correlation between at least one pair of codes from these different sets.

For the purposes of the present invention, the term "rake receiver" refers to a method for combining multipath signals in order to increase the processing gain.

For the purposes of the present invention, the term "signal to noise ratio (SNR)" refers to the conventional meaning of signal to noise ratio, i.e., the ratio of the signal to noise (and interference).

For the purposes of the present invention, the term "spread spectrum" refers to techniques that use spreading codes to increase the bandwidth of a signal to more effectively use bandwidth while being resistant to frequency selective fading.

For the purposes of the present invention, the term "spreading code" refers to pseudorandom number sequences that are used to increase the width of the signal in frequency space in spread spectrum systems. Examples of spreading codes include: Gold, Barker, Walsh codes, etc.

For the purposes of the present invention, the term "steering vector" refers to a vector that contains the phase history of a signal that is used in order to focus the signal of interest.

For the purposes of the present invention, the term "symbol" refers to the fundamental information-bearing unit transmitted over a channel in a modulation scheme. A symbol may be composed of one or more bits that may be recovered through demodulation For the purposes of the present invention, the term "transpose" refers to a mathematical operation in which a matrix is formed by interchanging rows and columns of another matrix. For example, the first row becomes the first column; the second row becomes the second column, and so on.

DESCRIPTION

The serial cancellation CSPE receiver incorporates the coded signal-processing engine (CSPE) into a spread spectrum receiver architecture in which interference cancellation is performed in a serial manner. Specifically, interference cancellation operations of single fingers, e.g., single LOS or multipath from a transmission source, on the measured data are performed in a serial, or cascading, manner, typically from highest to lowest power signals. Each processing finger may operate on the measured data y or on processed data in which one or more interference signals have been cancelled. One benefit of the serial approach is that a serial receiver processing-finger may acquire, track and demodulate a signal that is buried beneath the interference floor. A master control module controls data flow and control signals for all processing fingers. Depending on the power of the signals acquired, the CSPE may or may not cancel the interference of the previous signal(s).

Figure 2:
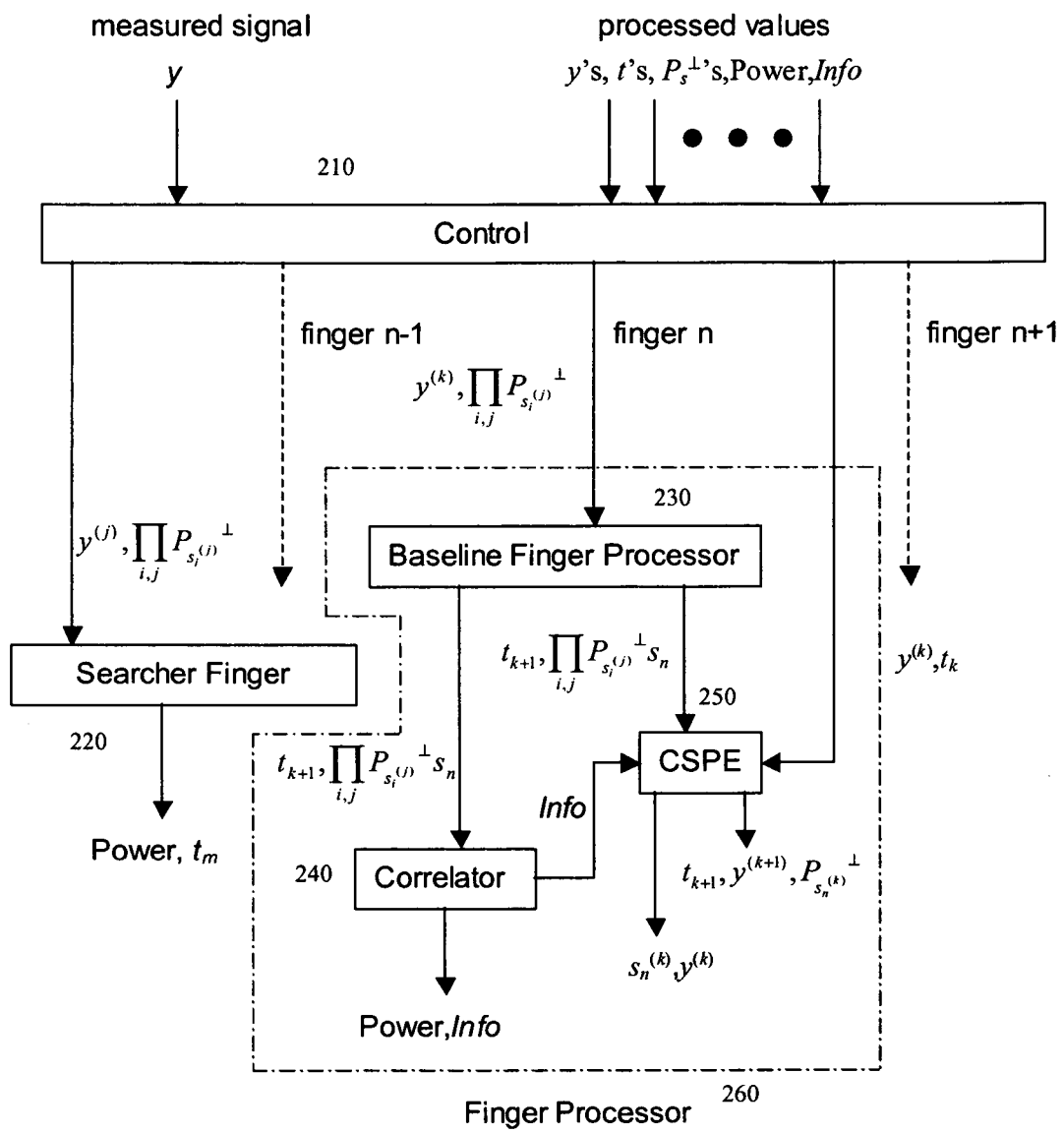
FIG. 2 is a block diagram depicting a generalized architecture of a serial receiver constructed in accordance with a preferred embodiment of the present invention.

The serial architecture 200 is presented in FIG. 2 in a generalized form with an arbitrary number of processing fingers 210, 212, 214. For clarity, only three processing fingers are illustrated. Particular embodiments, later described, will provide cdmaOne and cdma2000 specific elements of the present invention. FIG. 2 depicts a serial receiver 200 and an arbitrary finger processor 260 containing finger 212 and illustrating the data flow therein. Signal 202 may either be processed at an intermediate frequency (IF) or at base-band (BB) frequency. The connections depicted in the subsequent figures may either be for a single IF signal or I (in-phase) and Q (quadrature) base-band signals.

A description of each element of FIG. 2 is contained in the following subsections.

Control

Control block 206 controls data flow for all processing fingers 210, 212, 214 in receiver 200, i.e., it determines which data stream, time offsets, projection operators and other parameters are sent to each processing finger 210, 212, 214. Moreover, it maintains a master time or an equivalent method of representing time of arrival that is used by all the processing fingers for the determination of code offsets in time. Controller 206 may be modified as desired to achieve particular network requirements. Note that it is to be understood that various changes and modifications may be made to controller 206 without departing from the teachings of the present invention. Such changes and modifications are to be understood as included within the scope of the present invention. For example, due to memory and other computational reasons it may be necessary to pass the interference matrix S to a module rather than the projection matrix $P_S^{195}$.

In a preferred embodiment, the inputs for controller 206 are illustrated as items 202 and 204 and may include, but are not limited to: $y^{(j)}$—data stream containing the transmitted signals where the j index specifies the number of interference signals that have been removed; $t_k$—time offset for the signal, where k is the signal index; $P_{S_n^{(k)}}^\perp$—projection operator, where the n index denotes the signal number while the k index specifies the number of interference signals that have been removed; P—estimate of the power of the tracked signals to determine which signals should be cancelled and in which order the signals should be cancelled; and Info—an optional parameter that may either specify relative signal amplitude of the signals or polarity of the bits transmitted. This information is specifically used for cancellation purposes. The minimum input parameters for cancellation purposes include: $y^{(j)}$, $t_k$, and $P_{s_n^{(k)}}^\perp$.

The outputs for controller 206 are illustrated as data elements 208, 210, 212, 214, and 216. Each of these data elements may contain: $y^{(k)}$—a data stream in which k interference signals have been removed;

$$\prod_{i,j} P_{s_i(j)}^\perp -$$

a product of the projection operators that is used to remove the k interference signals; and/or $t_k$—time offset for the kth interference signal.

Searcher Finger

Searcher finger block 220 acquires a signal in the received data 208. Inputs for searcher finger block 220, include, but are not limited to: $y^{(j)}$—a data stream in which j interference signals have been removed; and $$\prod_{i,j} P_{s_i(j)}^\perp -$$

a product of the projection operators, which is used to remove the k interference signals. Searcher finger block 220 provides time offset and relative power information to finger processor 260. The time offset is a coarse approximation, the accuracy of which is further refined in the tracking loop or code offset estimation of finger processor 260. Searcher finger block 220 may operate on either the unprocessed segment of data or on a processed segment of data, which has been operated on by a projection operator in a processing finger's CSPE block in order to remove an interference signal(s).

Depending on the constraints of the system, the searcher algorithm may take many forms. A standard CDMA searcher continually searches the unprocessed segment y 202 for new signals to be assigned to processing fingers 210, 212, 214. Embodiments of the present invention have the capability to search within unprocessed data and the processed data, e.g., $y^{(1)}$, $y^{(2)}$, ..., $y^{(n-1)}$. For example, the searcher algorithm may focus its processing time on the y 202 with the greatest number of signals removed to facilitate the acquisition of signals buried by the interference, it could search each y alternatively for a short period of time or have additional searchers or correlators search $y^{(1)}$, $y^{(2)}$, ..., $y^{(n-1)}$. The former has difficulties when the relative powers of the signals are changing and fingers are being reassigned because of the dependencies of cancellation ordering in the serial cancellation process. The latter may unnecessarily process y's with few or no signals cancelled, thereby decreasing the probability of acquiring additional signals since they may be buried beneath the interference floor of stronger signals. The addition of new searchers or correlators may be costly to implement. The complexity of the searcher algorithm is dependent on the parameters of receiver architecture.

The use of any prior art searcher algorithm is considered within the scope of the present invention. As may be seen, the outputs from searcher finger block 220 are preferably, $t_m$—time offset for the (m)th signal acquired by the searcher; and an estimate of signal power that is used to determine the order of the serial cancellation and to determine whether signal cancellation is required for the acquisition of particular signals. The output is illustrated by element 222. Outputs 222 may be utilized to facilitate the acquisition of signals buried by the interference or may search each $y^{(j)}$ alternatively for a short period of time, for simplicity, and may be provided to controller 206 as input 204 for these purposes.

Baseline Finger Processor

Baseline finger processor 230 tracks a signal in the received data $y^{(k)}$ in 212. It provides time offset information $t_{k+1}$ and an estimate of the tracked signal (reference signal) 232 to subsequent blocks in the processing finger for correlator 240 and for the construction of interference matrices 250. The inputs for baseline finger processor 230 are illustrated by element 212 and include: $y^{(k)}$—a data stream in which k interference signals have been removed; and $$\prod_{i,j} P_{s_i(j)}^\perp -$$

a product of the projection operators which is used to remove the k interference signals.

If the data has been operated on by a projection operator in another processing finger's CSPE block 250, in order to remove an interference signal(s), then it will be necessary to use the projection operator(s) in the creation of a reference signal for correlation purposes. This is illustrated as one of the inputs in 232.

As may be seen from FIG. 2, the outputs from baseline finger processor 230 are:

$$\prod_{i,j} P_{s_i(j)}^\perp s_n -$$

a product of the projection operators, used to remove the k interference signals, and a reference signal of the signal tracked in the baseline receiver where n specifies the signal index; and $t_{k+1}$—time offset for the (k+1)th signal tracked in the baseline receiver. These outputs are represented by element 232. As may be seen, output 232 is provided to both correlator 240 and CSPE 250.

Correlator block 240 (shown in FIG. 2) calculates a power estimate P in 244 that is used by control block 206 to order the signals for serial cancellation. Namely, it determines whether a cancellation is necessary in each processing finger and in which order. Additionally, the parameter Info is provided that supplies either information on bits transmitted, relative power information or no information to control block 206 depending on the receiver architecture. Information on bits transmitted or relative power is necessary for certain cancellation methods where there is bit boundary misalignment and where cancellation is performed on segments longer than one Walsh symbol as disclosed in U.S. Provisional Patent Application No. 60/331,480, entitled "Construction of an Interference Matrix for a Coded Signal Processing Engine," the entire contents and disclosure of which is hereby incorporated by reference herein.

As may be seen, the inputs for correlator 240 include:

$$\prod_{i,j} P^{\perp}_{s_i^{(j)}} s_n -$$

a product of the projection operators that remove the k interference signals and an estimate of the signal tracked in the baseline receiver where n specifies the signal index; and $t_{k+1}$—time offset for the (k+1)th signal tracked in the baseline receiver. The outputs of correlator 240 include: Info—either bits transmitted or relative signal amplitude information, if required by the cancellation method; and Power—estimate of signal power that is used to determine the order of the serial cancellation and to determine whether signal cancellation is required for the acquisition and/or tracking of particular signals.

If the data has been operated on by a projection operator in another processing finger's CSPE block 250, in order to remove an interference signal(s), it will be necessary to use the projection operator(s) in the creation of a reference signal for correlation purposes. This is illustrated as one of the inputs in 232. The output of correlator 240 is illustrated by element 244 and comprises power and other signal information, as discussed above. Correlator 240 may be modified as desired to achieve particular network requirements.

To track signal $s_1$ from the original data y, the data is correlated with a reference signal for $s_1$ in block 240. However, to track a signal $s_n$ after k interference signals have been removed, data is correlated with a reference signal $s_n^{(k)}$, which is produced after multiplying the original $s_n$ by the k corresponding projection operators, or by the reference signal $s_n^{(k-1)}$. The flexibility in being able to use two different reference signals, i.e. either $s_n^{(k)}$ or $s_n^{(k-1)}$, for the correlation operation with $y^{(i)}$, where i>0, is due to the idempotent nature of projection matrices, i.e., $(P_S^{\perp})^T(P_S^{\perp}) = P_S^{\perp}$.

For example, consider the correlation $s_2^{(1)T} y^{(1)}$:

$$s_2^{(1)T} y^{(1)} = (P_{s_1}^{\perp} s_2)^T (P_{s_1}^{\perp} y)$$
$$= s_2^T P_{s_1}^{\perp T} P_{s_1}^{\perp} y = s_2^T P_{s_1}^{\perp} y = s_2^T (P_{s_1}^{\perp} y) = s_2^T y^{(1)} \quad (9)$$

In general, the reference signal being correlated with the measured data may either have as many projection operators applied to it as the measured data or all but the last projection operator. Consider the following correlation:

$$s_m^{(n)T} y^{(n)} = \quad (10)$$
$$= (P_{s_n} \cdot P_{s_{n-1}} \cdot \ldots \cdot P_{s_1} s_m)^T (P_{s_n} \cdot P_{s_{n-1}} \cdot \ldots \cdot P_{s_1} y)$$
$$= s_m^T P_{s_1}^T \cdot \ldots \cdot P_{s_{n-1}}^T \cdot P_{s_n}^T P_{s_n} \cdot P_{s_{n-1}} \cdot \ldots \cdot P_{s_1} y$$
$$= s_m^T P_{s_1}^T \cdot \ldots \cdot P_{s_{n-1}}^T \cdot P_{s_n} \cdot P_{s_{n-1}} \cdot \ldots \cdot P_{s_1} y$$
$$= (P_{s_{n-1}} \cdot P_{s_{n-2}} \cdot \ldots \cdot P_{s_1} s_m)^T (P_{s_n} \cdot P_{s_{n-1}} \cdot \ldots \cdot P_{s_1} y)$$
$$= s_m^{(n-1)T} y^{(n)}$$

Both the correlation $s_m^{(n)T} y^{(n)}$ and the correlation $s_m^{(n-1)T} y^{(n)}$ are mathematically equivalent, though the latter is computationally more efficient since it requires the application of one fewer projection matrix.

Application of a projection operator to a reference signal is straightforward when the symbol boundaries, of the signal to be cancelled, align with the boundaries of the signal for which one is looking, or the signal for which one is looking has no symbol boundaries. For example, when acquiring and tracking a signal using a pilot channel over a segment length equivalent to one Walsh symbol in cdmaOne and cdma2000, the symbol boundaries are not relevant since Walsh code zero, used for the pilot, is all zeros. However, misalignment issues may arise for signals with symbol boundaries when applying a projection operator to a reference signal.

CSPE block 250 (shown in FIG. 2) provides interference mitigation by generating a projection operator $P_s^{\perp}$ to cancel the interfering signals represented in the matrix S:

$$P_s^{\perp} = I - S(S^T S)^{-1} S^T \quad (11)$$

The operator $P_s^{\perp}$ removes the signals in the interference matrix S from the input data y.

$$P_s^{\perp} y = y - S(S^T S)^{-1} S^T y \quad (12)$$

In the serial canceller, the matrix S consists of the signal s tracked in the current processing finger and all channels to be cancelled. The processed data $y^{(k+1)}$ and the projection operator $P_{s_n}^{(k)\perp}$ are sent to the control module for processing by subsequent fingers. The inputs for CSPE include:

$$\prod_{i,j} P^{\perp}_{s_i^{(j)}} s_n -$$

a product of the projection operators, used to remove the k interference signals, and the signal tracked in the baseline receiver where the n specifies the signal index; $t_{k+1}$—time offset for the (k+1)th signal tracked in the baseline receiver; and, if required, Info—either bits transmitted or relative signal amplitude information. The outputs for CSPE include: $s_n^{(k)}$—an estimate (reference signal) of the signal currently tracked in the processing finger; $y^{(k)}$—a processed data stream in which k interference signals have been removed; $y^{(k+1)}$—a processed data stream in which k+1 interference signals have been removed including the signal currently being tracked; $t_{k+1}$—time delay for the (k+1)th signal tracked in the baseline receiver; and $P_{s_n}^{(k)\perp}$—projection operator for the removal of $s_n^{(k)}$.

For a detailed description of the CSPE, the reader is referred to U.S. Provisional Patent Application No. 60/331,480, entitled "Construction of an Interference Matrix for a Coded Signal Processing Engine," filed Nov. 16, 2001; U.S. patent application Ser. No. 09/988,218, entitled "Interference Cancellation In a Signal," filed Nov. 19, 2001; U.S. patent application Ser. No. 09/988,219, entitled "A Method and Apparatus for Implementing Projections in Signal Processing Applications," filed Nov. 19, 2001; U.S. Provisional Patent Application No. 60/326,199, entitled "Interference Cancellation in a Signal," filed Oct. 2, 2001; U.S. Provisional Patent Application No. 60/325,215, entitled "An Apparatus for Implementing Projections in Signal Processing Applications," filed Sep. 28, 2001; U.S. Provisional Patent Application No. 60/251,432, entitled "Architecture for Acquiring, Tracking and Demodulating Pseudorandom Coded Signals in the Presence of Interference," filed Dec. 4, 2000; U.S. patent application Ser. No. 09/612,602, filed Jul. 7, 2000; and to U.S. patent application Ser. No. 09/137,183, filed Aug. 20, 1998. The entire disclosures and contents of these applications are hereby incorporated by reference.

Figure 3:
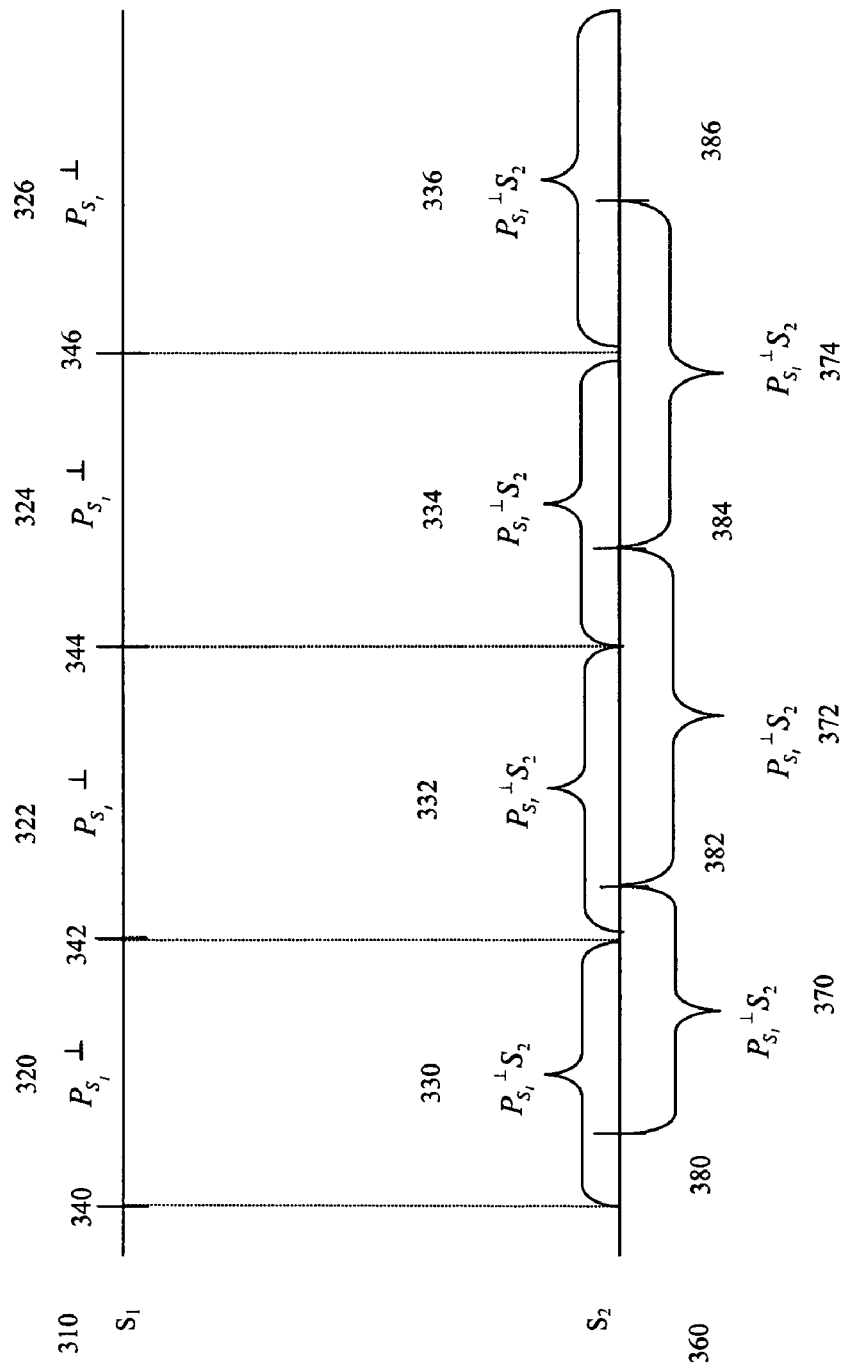
FIG. 3 is a depiction of how a projection operator may be applied to a reference signal when symbol boundaries of a signal being cancelled are not aligned with the reference symbol boundaries.

A system has herein been discussed in which the symbol boundaries are aligned. It should be appreciated that the teachings of the present invention may be utilized even if the signal boundaries are not aligned. FIG. 3 is a depiction of how a projection operator may be applied to a reference signal when symbol boundaries of a signal being cancelled are not aligned with the reference symbol boundaries of the signal of interest.

Consider two signals $s_1$ (310) and $s_2$ (360), illustrated in FIG. 3, where $s_1$ is canceled to demodulate $s_2$. As seen in FIG. 3, the symbol boundaries for $s_1$ and $s_2$ are not aligned and are offset by $\Delta_n$. As a result, the projection operator, constructed to cancel $s_1$, is applied to the $s_2$ reference signal such that it is aligned to the boundaries of $s_1$ 340, 342 344 and 346. However, when $s_2$ is demodulated, the segment used for correlation is aligned to the boundaries of $s_2$ 380, 382, 384 and 386. Projection operators 320, 322, 324 and 326 are constructed over segments aligned with symbol boundaries of $s_1$ and applied to $s_2$ resulting in segments 330, 332, 334 and 336. However, in order to demodulate $s_2$, it is necessary to correlate over segments 370, 372 and 374.

The correlation for demodulation may be written as $$(P_{s_1}^\perp s_2)^T (P_{s_1}^\perp y) \tag{13}$$

where the '' denotes that the projection operator is aligned to the symbol boundaries of $s_2$ rather than with $s_1$. As a result, $P_{s_1}^\perp$ is mathematically not a true projection operator. Instead, it is composed of portions of two adjacent $P_{s_1}^\perp$ operators that comprise the upper and lower portions of the $P_{s_1}^\perp$ matrix. Since, in general, the resulting matrix is not a true projection matrix, it is not guaranteed to be idempotent. Therefore, in the case of demodulation with misalignment between what is being cancelled and what is being demodulated, the following statement is, in general, not true:

$$s_m^{(n)^T} y^{(n)} = s_m^{(n-1)^T} y^{(n)} \tag{14}$$

Mathematically, it will then be necessary to always have the index n, corresponding to the projection operators, match between the data and the reference signal for demodulation purposes. In CDMA communication systems that use a pilot channel, acquisition and tracking of the pilot channel will be unaffected for a segment length corresponding to one Walsh symbol, since it is a non-information bearing channel with no symbol boundaries, and may exploit the idempotency of the projection operators by aligning with the segment corresponding to the projection operator.

Another method, which would require a greater amount of computation and require either bit or amplitude information, is to cancel signal $s_1$ from the data y to detect signal $s_2$, determine the alignment of the symbol boundaries of signal $s_2$, rebuild the projection operator to remove $s_1$ from y aligned to the symbol boundaries of $s_2$ and then correlate $s_2$ over the segment corresponding to the boundaries of $s_2$. Using this method would preserve idempotency even with misalignment between what is being cancelled and what is being detected. Therefore, in the case of demodulation with misalignment between what is being cancelled and what is being demodulated, the following statement is, in general, true for this method:

$$s_m^{(n)^T} y^{(n)} = s_m^{(n-1)^T} y^{(n)} \tag{15}$$

However, from an implementation perspective, the correlation $s_m^{(n)^T} y^{(n)}$ may be replaced by the correlation $s_m^T y^{(n)}$ where the projection operator(s) are not applied to the reference signal. Interference and the near-far effect are due to non-orthogonality of signals and a large disparity in power. If the signals that are cancelled are relatively orthogonal to the signal of interest, the projection operators have little effect on the reference signal for the signal of interest. As a result, the subspace angle between $s_m^{(n)}$ and $s_m$ is quite small and the vectors are similar. Therefore, the correlations $s_m^{(n)^T} y^{(n)}$ and $s_m^T y^{(n)}$ may likely yield similar results. In the present invention, this may be exploited whenever a projection operator or product of projection operators are applied to a reference signal, e.g., demodulation of data; determination of active channel, bits or amplitude information; and construction of the interference matrix, greatly simplifying the implementation.

Processing the Data

Suppose that the received data is composed of m signals ordered in terms of power from highest to lowest with additive white Gaussian noise (AWGN). The data y may be written as $$y = s_1 \theta_1 + s_2 \theta_2 + s_3 \theta_3 + \ldots + s_{m-1} \theta_{m-1} + s_m \theta_m + n \tag{16}$$

where $s_i$ denotes the ith signal, $\theta_i$ denotes the ith amplitude and n represents the noise term. Note a slight departure from previous convention in the prior art section where H, s, $\theta$ and $\phi$ were used. This change eliminates the need for H to be re-defined after each serial cancellation operation.

The following procedure is an example of how the data processing may proceed. There is a minimum one segment computational delay between each processing finger in which a signal is removed. It is necessary to create a reference signal over an entire segment before it is cancelled from the measured data. Subsequently, another processing finger may process that segment of data with the previous signal removed.

Figure 4:
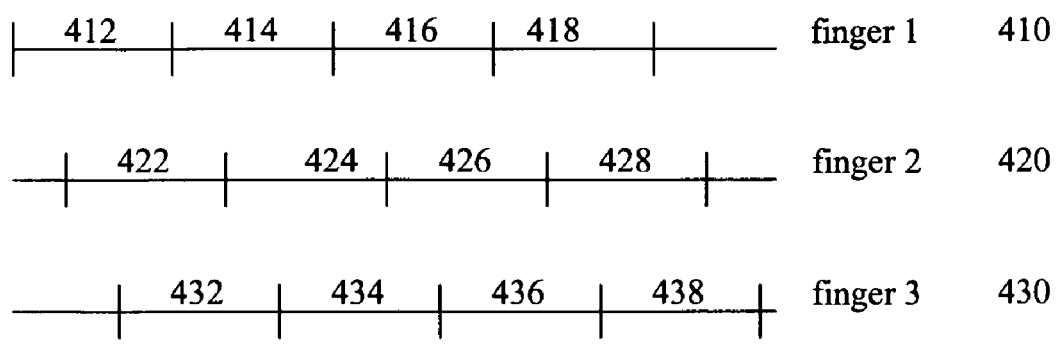
FIG. 4 is a depiction of misalignment of symbol boundaries and the inherent causality in cancellation associated therewith.

FIG. 4 depicts processing delay due to the misalignment of symbol boundaries between fingers. The vertical lines occur at symbol boundaries, however, there may be more than one symbol per segment. FIG. 4 shows finger 1, illustrated as reference numeral 410 and having segments 412, 414, 416, 418; finger 2, illustrated as reference numeral 420 and having segments 422, 424, 426, 428; and finger 3, illustrated as reference numeral 430 and having segments 432, 434, 436, 438 where time increases in the direction of increasing segment reference number. The segments for each finger are misaligned as illustrated by the dashed lines. In order to process segment 422 with the interference of finger 1 (410) removed it is necessary to have processed segments 412 and 414. Similarly, to process segment 424 with the interference of finger 1 (410) removed it is necessary to have processed segments 414 and 416. Furthermore, in order to process segment 432 with fingers 1 (410) and 2 (420) removed it is necessary to have processed segments 422 and 424 which subsequently require the processing of segments 412, 414 and 416. Effectively, there may be at least a one-segment delay between each finger in which a cancellation occurs.

When a receiver begins processing the data stream, the control block arbitrarily assigns reception of the strongest signal to a processing finger, hereafter referred to as the first processing finger. Moreover, processing fingers that track subsequent signals will be referred to as the second processing finger, the third processing finger, . . . , nth processing finger, respectively. Relative finger power may change during processing and either the fingers may be re-assigned to maintain a particular ordering of power or the control block may maintain a record of the order in terms of power and process accordingly.

First Processing Finger

Control block 206 sends the raw received signal data y, but no $P_s^\perp$ information or time t information to the finger processing block 260 and y to CSPE block 250. Baseline block 230 calculates an estimate of the parameters corresponding to the signal of interest by correlating with a generated reference signal $s_1$ and the signal, offset delay $t_1$ and potentially the phase and doppler frequency to CSPE block 250 and correlator block 240. CSPE block 250 generates the projection operator $P_{s_1}^\perp$ and operates on the data y to produce the processed data $y^{(1)}$ with the first signal removed.

$$P_{s_1}^\perp = I - s_1(s_1^T s_1)^{-1} s_1^T \tag{17}$$

$$y^{(1)} = P_{s_1}^\perp y \tag{18}$$

$$y^{(1)} = P_{s_1}^\perp s_1 \theta_1 + P_{s_1}^\perp s_2 \theta_2 + P_{s_1}^\perp s_3 \theta_3 + \ldots + P_{s_1}^\perp s_{m-1} \theta_{m-1} + P_{s_1}^\perp s_m \theta_m + P_{s_1}^\perp n \tag{19}$$

$$y^{(1)} = P_{s_1}^\perp s_2 \theta_2 + P_{s_1}^\perp s_3 \theta_3 + \ldots + P_{s_1}^\perp s_{m-1} \theta_{m-1} + P_{s_1}^\perp s_m \theta_m + P_{s_1}^\perp n \tag{20}$$

For simplicity, any nonzero multiplicative operation on the noise term n will produce a product n, i.e., Xn=n. Moreover, $s_i^{(1)}$ is defined as $s_1^{(1)} = P_{s_1}^\perp s_i$.

$$y^{(1)} = s_2^{(1)} \theta_2 + s_3^{(1)} \theta_3 + \ldots + s_{m-1}^{(1)} \theta_{m-1} + s_m^{(1)} \theta_m + n \tag{21}$$

CSPE block 250 sends the signal $s_1$ and y to the combiner (not illustrated), if necessary, and the Viterbi decoder. In addition, $y^{(1)}$, $P_{s_1}^\perp$ and $t_1$ are sent to control block 206. Correlator block 240 calculates a power measurement P and the Info term that is sent to control block 206.

After the first processing finger acquires and tracks the strongest signal, control block 206 will attempt to acquire and track a second signal (multipath of first signal or a second transmitter). Control block 206 will make the determination of whether the acquisition procedure will operate on processed data with the strongest signal removed or if it will operate on the original data. This will determine which data and parameters are passed to the second processing finger.

Second Processing Finger

According to an embodiment of the present invention, without loss of generality, the control block sends the processed data $y^{(1)}$, $P_{s_1}^\perp$ and the time offset information $t_1$ to the baseline finger processing block and $y^{(1)}$ to the CSPE block to effectively find a second signal with the strongest signal cancelled. The baseline finger processing block calculates an estimate of the next strongest signal by correlating with either the generated reference signal $s_2^{(1)} = P_{s_1}^\perp s_2$ or $s_2$ and sends the signal and offset delay $t_2$ to the CSPE and correlator blocks. The CSPE block generates the projection operator $P_{s_2^{(1)}}^\perp$ and operates on the data $y^{(1)}$ to produce the processed data $y^{(2)}$ that has the second signal removed.

$$P_{s_2^{(1)}}^\perp = I - s_2^{(1)} (s_2^{(1)T} s_2^{(1)})^{-1} s_2^{(1)T} \tag{22}$$

$$y^{(2)} = P_{s_2^{(1)}}^\perp y^{(1)} = P_{s_2^{(1)}}^\perp P_{s_1}^\perp y \tag{23}$$

$$y^{(2)} = P_{s_2^{(1)}}^\perp s_2^{(1)} \theta_2 + P_{s_2^{(1)}}^\perp s_3^{(1)} \theta_3 + P_{s_2^{(1)}}^\perp s_4^{(1)} \theta_4 + \ldots + P_{s_2^{(1)}}^\perp s_{m-1}^{(1)} \theta_{m-1} + P_{s_2^{(1)}}^\perp s_m^{(1)} \theta_m + P_{s_2^{(1)}}^\perp n \tag{24}$$

$$y^{(2)} = s_3^{(2)} \theta_3 + s_4^{(2)} \theta_4 + \ldots + s_{m-1}^{(2)} \theta_{m-1} + s_m^{(2)} \theta_m + n \tag{25}$$

The CSPE block sends the signal $s_2^{(1)}$ and $y^{(k)}$ to the Viterbi decoder while $y^{(2)}$, $P_{s_2^{(1)}}^\perp$ and $t_2$ are sent to the control block. The correlator block calculates the power measurement term P and the Info term that may be subsequently sent to the control block.

The control block continues to compare the power measurement of the two transmitters. If the second measurement exceeds the power of the first, the control flow may change and the two processing fingers of the receiver will effectively switch roles. Namely, signal two will be removed from the data (if necessary) and then either the processed data or original signal will be sent to the processing finger operating on the first signal.

After the second finger acquires and tracks the next strongest signal, the control block will attempt to acquire and track a third signal (multipath of the first or second signal or a second or third transmitter). The control block will make the determination of whether the acquisition procedure will operate on the data with either the two strongest signals removed, one of them removed or if it will operate on the original data. This will determine which data and parameters are passed to the third processing finger.

Third Processing Finger

According to an embodiment of the present invention, without loss of generality, the second signal does not need to be removed and the control block sends the processed data $y^{(1)}$, $P_{s_1}^\perp$ and the time delay information $t_2$ to the baseline receiver block and $y^{(1)}$ to the CSPE block to effectively find the third strongest signal with the signal in processing finger 1 removed. The baseline finger processing block calculates an estimate of the next strongest signal by correlating with a generated reference signal $s_3^{(1)} = P_{s_1}^\perp s_3$ or $s_3$ and sends the reference signal and offset delay $t_3$ to the CSPE and correlator blocks. The CSPE block generates the projection operator $P_{s_3^{(1)}}^\perp$ and operates on the data $y^{(1)}$ to produce the processed data $y^{(2')}$ that has the first and third signals removed. The prime denotes that different signals were cancelled than in the previous processing finger case, i.e., (2) refers to the cancellation of processing fingers 1 and 2 whereas (2') refers to the cancellation of processing fingers 1 and 3.

$$P_{s_3^{(1)}}^\perp = I - s_3^{(1)}(s_3^{(1)T} s_3^{(1)})^{-1} s_3^{(1)T} \tag{26}$$

$$y^{(2')} = P_{s_3^{(1)}}^\perp y^{(1)} = P_{s_3^{(1)}}^\perp P_{s_1}^\perp y \tag{27}$$

$$y^{(2')} = P_{s_3^{(1)}}^\perp s_2^{(1)} \theta_2 + P_{s_3^{(1)}}^\perp s_3^{(1)} \theta_3 + P_{s_3^{(1)}}^\perp s_4^{(1)} \theta_4 + \ldots + P_{s_3^{(1)}}^\perp s_{m-1}^{(1)} \theta_{m-1} + P_{s_3^{(1)}}^\perp s_m^{(1)} \theta_m + P_{s_3^{(1)}}^\perp n \tag{28}$$

$$y^{(2')} = s_2^{(2')} \theta_2 + s_4^{(2')} \theta_4 + \ldots + s_{m-1}^{(2')} \theta_{m-1} + s_m^{(2')} \theta_m + n \tag{29}$$

The CSPE block sends the signal $s_3^{(1)}$ and $y^{(1)}$ to the Viterbi decoder while $y^{(2')}$, $P_{s_3^{(1)}}^\perp$ and $t_3$ are sent to the control block. The correlator block calculates a power measurement P and the Info term that may be subsequently sent to the control block.

The control block continues to compare the power measurement of the three transmitters. If the relative powers switch order, then the control flow may change and the appropriate processing fingers of the receiver will effectively switch roles. Moreover, the CSPE may be turned on or off depending on the power requirements and the level of interference.

Effectively, this procedure may be continued for an arbitrary number of processing fingers. Consider the nth processing finger in this process.

Nth Processing Finger

According to an embodiment of the present invention, without loss of generality, the control block sends the processed data $y^{(k)}$ with k (k<n) signals removed, the product of the corresponding k projection operators $$\prod_{i,j} P^+_{s_i^{(j)}}$$

and the time offset information $t_{n-1}$ to the baseline receiver block and $y^{(k)}$ to the CSPE block to effectively find the nth strongest signal with k signals removed. The baseline block calculates an estimate of the tracking parameters of the next strongest signal by correlating with a generated reference signal $$s_n^{(k)} = \prod_{i,j} P^+_{s_i^{(j)}} s_n$$

and sends the signal and offset delay $t_n$ to the CSPE and correlator blocks. The CSPE block generates the projection operator $P_{s_n^{(k)}}^+$ and operates on the data $y^{(k)}$ to produce the processed data $y^{(k+1)}$ that has the nth signal removed.

$$P^+_{s_n^{(k)}} = I - s_n^{(k)}\left(s_n^{(k)T} s_n^{(k)}\right)^{-1} s_n^{(k)T} \quad (30)$$

$$y^{(k+1)} = P^+_{s_n^{(k)}} y^{(k)} = \prod_{i,j} P^+_{s_i^{(j)}} y \quad (31)$$

$$y^{(k+1)} = P^+_{s_n^{(k)}} s_1^{(k)} \theta_1 + \ldots + P^+_{s_n^{(k)}} s_{n-1}^{(k)} \theta_{n-1} + \\ P^+_{s_n^{(k)}} s_n^{(k)} \theta_n + P^+_{s_n^{(k)}} s_{n+1}^{(k)} \theta_{n+1} + \ldots + P^+_{s_n^{(k)}} s_m^{(k)} \theta_m + P^+_{s_n^{(k)}} n \quad (32)$$

where k signals have been removed from the first n signals.

$$y^{(k+1)} = s_1^{(k+1)} \theta_1 + \ldots + s_{n-1}^{(k+1)} \theta_{n-1} + s_{n+1}^{(k+1)} \theta_{n+1} + \ldots + s_m^{(k+1)} \theta_m + n \quad (33)$$

The CSPE block sends the signal $s_n^{(k)}$ and $y^{(k)}$ to the Viterbi decoder while $y^{(k+1)}$, $P_{s_n^{(k)}}^+$ and $t_n$ are sent to the control block. The correlator block calculates a power measurement P and the info term that is subsequently sent to the control block.

The control block continues to compare the power measurement of all the transmitters that are being tracked. If the ordering of the fingers, based on their relative power, changes, then the control flow may change and the appropriate processing fingers of the receiver will effectively switch roles. Moreover, the CSPE may be turned on or off for particular fingers depending on the power requirements and the amount of interference.

The following particular embodiments present the cdmaOne forward link serial CSPE canceling receiver and the cdma2000 forward link serial CSPE canceling receiver, respectively.

EXAMPLE I

The following embodiment is the cdmaOne (IS-95) forward link receiver. The cdmaOne serial cancellation CSPE receiver incorporates the coded signal-processing engine (CSPE) into a cdmaOne receiver architecture in which interference cancellation is performed in a serial manner as described above. Specifically, interference cancellation operations of single fingers, e.g., one or more channels from a LOS or multipath signal, are performed in a serial, or cascading, manner, typically ordered in terms of power from highest to lowest. Each processing finger may operate on the received data y or on processed data in which one or more interference signals have been cancelled. The benefit of this serial approach is that a serial receiver processing-finger may track and demodulate a signal that may otherwise be buried beneath the interference and may be undetectable by a baseline receiver. A master control module controls data flow and control signals for all processing fingers. Depending on the power of the signals that are to be acquired, the CSPE may or may not cancel the interference of the previous signal(s).

Figure 5:
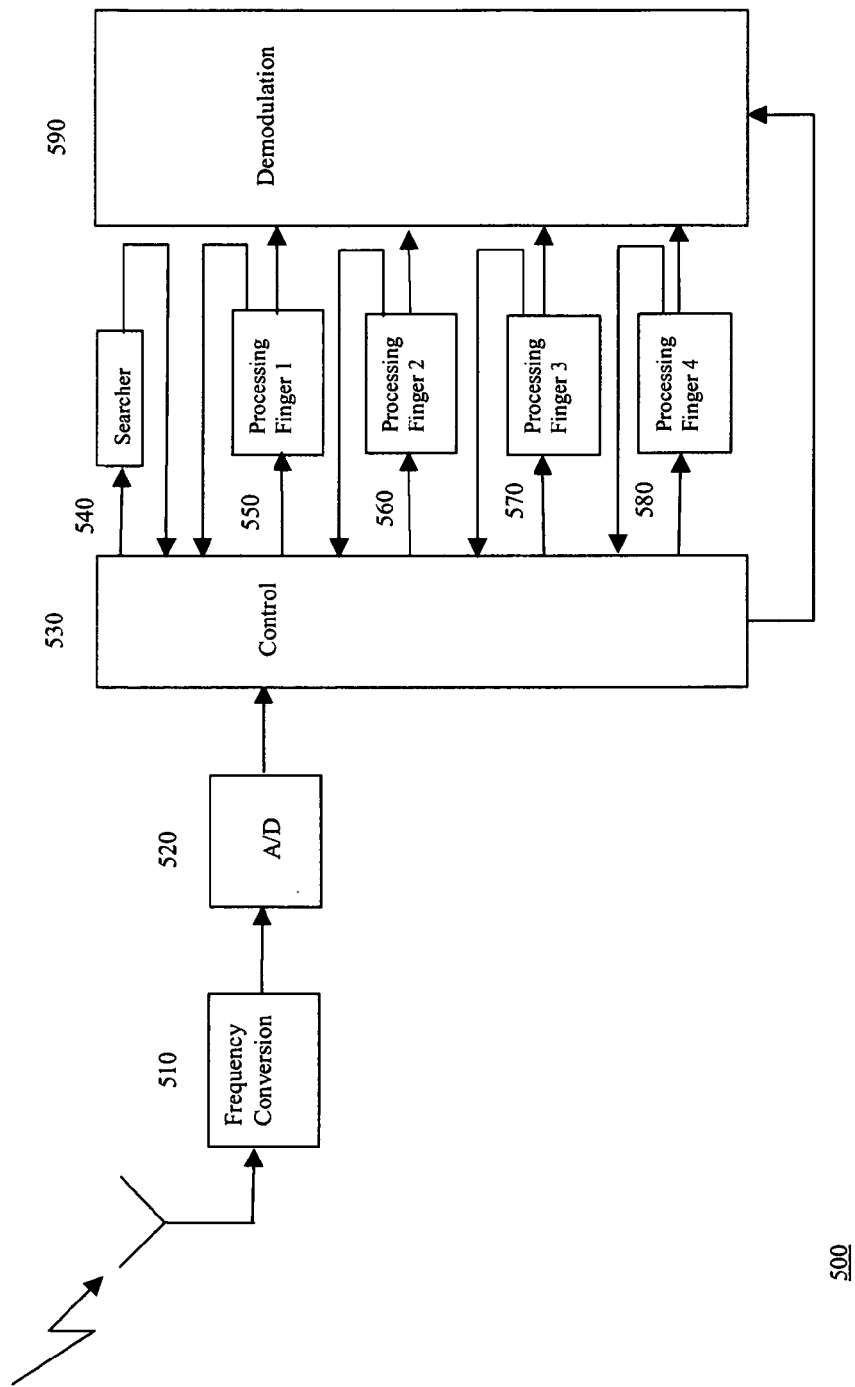
FIG. 5 is a block diagram depicting an architecture for a forward link receiver constructed in accordance with the teachings of the present invention and utilized in cdmaOne and/or cdma2000 systems.

FIG. 5 depicts a forward link receiver 500. An RF signal 502 is received by antenna 504 and then is down-converted by converter 510 from RF to base-band (BB) based on a nominal carrier frequency. It should be appreciated that the present invention encompasses receivers that process either base-band or IF. The base-band signal is then sampled in an analog to digital converter (A/D) 520 to create a digital signal. Control module 530 feeds the digital signal into searcher 540, which acquires the strongest signal finger and communicates the short code offset and possibly the Doppler frequency to control module 530. Searcher 540 continues to search over the code offsets in order to acquire another signal. Control module 530 feeds the data and acquisition information into one of the four processing fingers 550, 560, 570 and 580, respectively. While FIG. 5 depicts four processing fingers, the present invention is not limited to a specific number of processing fingers but instead applies to an arbitrary number of fingers.

Without loss of generality, assume for this example that the finger is assigned to finger processor 550. The finger processor tracks the finger, demodulates the signal, creates an interference matrix to cancel the signal and finally removes the signal from the input data signal. The demodulated signal is fed to demodulation module 590 that performs the Rake receiver combining as needed for multipath signals. The interference matrix and processed data are fed back to control module 530.

With information from searcher 540 and the neighbor list for the finger tracked in processing finger 550, control module 530 will decide whether to track a multipath associated with the finger currently tracked in processing finger 550 or the signal of another base station. Control module 530 has searcher 540 search over the code offsets for other strong signals in either the received data or in the data with the interfering finger removed. The latter is done if the interference from the first signal is too strong to detect another signal or the removal will facilitate acquisition. Without loss of generality, the second finger is fed to finger processor 560 with data that has the strong signal removed. The signal is tracked, demodulated, an interference matrix is created and the signal is removed from the input data signal. The resulting signal has the first two tracked signals removed from it in a serial manner, i.e., successive cancellations.

The process continues in a similar manner for the other finger processors. Searcher 540 may search the received data or data in which interference signal(s) have been removed in a serial manner. Multipath signals corresponding to the same base station are combined in a Rake receiver in module 590.

Figure 6:
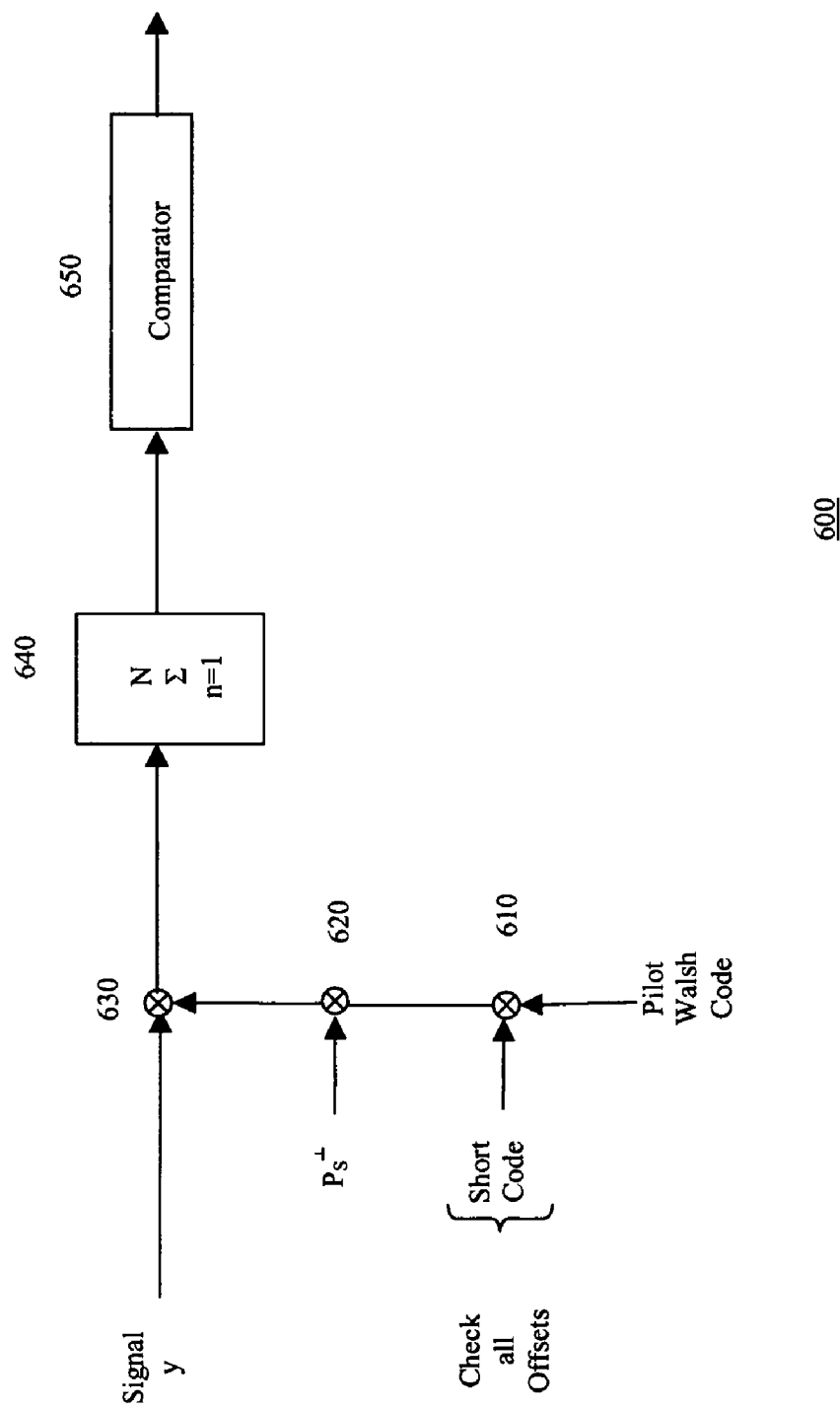
FIG. 6 is a block diagram depicting a searcher finger of the receiver illustrated in FIG. 5 and utilized in a cdmaOne system.

In FIG. 6, a searcher 600 (such as that shown previously in FIG. 5, element 540) is discussed in greater detail. The pilot Walsh code, which is all zeros, is multiplied by the short code in multiplier 610. If the input data y has had interference signals removed, then the product of multiplier 610 is multiplied by the corresponding projection matrices in multiplier 620. The reference signal computed in 620 is multiplied by the input data signal y in multiplier 630. The correlation procedure is completed by summing the product of y and the reference signal over a correlation length N in summation block 640. The short code multiplied in multiplication block 610 is chosen such that the reference signal checks all possible code offsets.

Comparator 650 uses standard methods to select the strongest signal. However, if a processing finger is already tracking a signal then that signal will not be reacquired. Moreover, if the receiver has enough signals (LOS and/or multipath signals) from one base station, the searcher may be instructed to not acquire any more multipath signals from the same base station. Depending on the searching algorithm, the control module may provide the searcher with either an unprocessed signal or one in which interference signal(s) have been removed.

Figure 7:
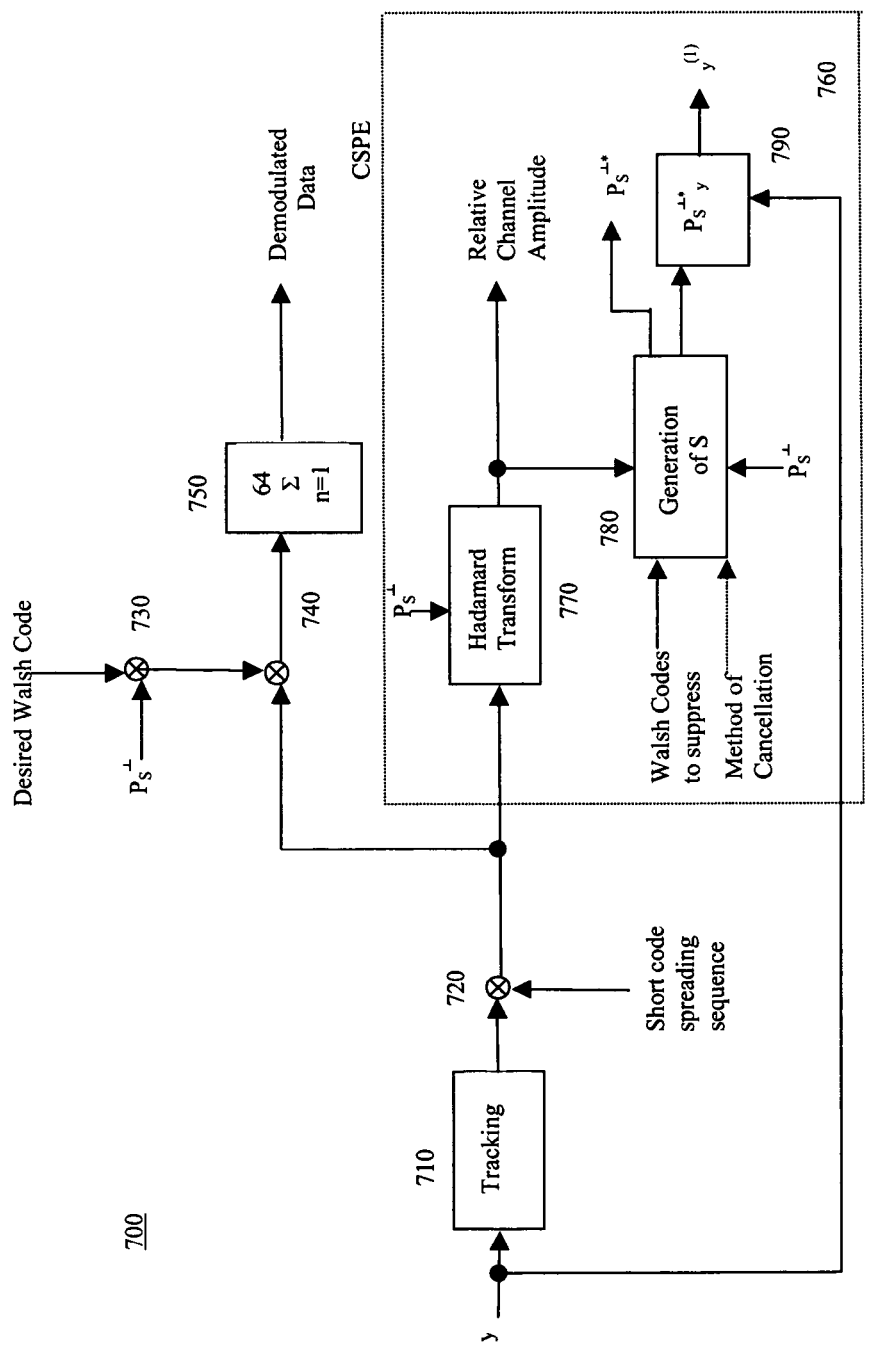
FIG. 7 is a block diagram depicting a processing finger of the receiver illustrated in FIG. 5 and utilized in a cdmaOne system.

In FIG. 7, a processing finger 700 (such as that shown previously in FIG. 5, element 550) is discussed in greater detail. The parameters associated with the input signal y are refined in tracking loop(s) 710. Tracking loop(s) 710 may include a delay-locked loop (DLL) or code offset estimation, a phase-locked loop (PLL) or phase estimation and/or a frequency-locked loop (FLL) or frequency estimation. At this point, this embodiment of the present invention differs from the standard baseline cdmaOne receiver architecture. The data flow is split between the architecture for signal demodulation and the CSPE architecture 760 for interference cancellation. Tracking loop(s) or estimation modules 710 refine the parameters for the reference signal generation used in the demodulation of the channel. After tracking loop(s) or estimation modules 710, the signal is de-spread by multiplying an appropriate short code spreading sequence and the phase is stripped in multiplier 720.

The Walsh code of the desired channel is multiplied by a projection matrix or product of projection matrices in multiplier 730, if necessary, and is multiplied with the data signal in multiplier 740. The product of the data and the reference code is summed in summer 750 over one Walsh symbol. The demodulated data is then fed to a demodulation module, such as shown in FIG. 5, element 590, where Rake receiver combining is performed when multipath signals from the same base station are being demodulated concurrently.

A modified Hadamard transform module 770 is applied to the de-spread data signal. The Walsh codes used for channelization in cdmaOne are derived from a rank 64 Hadamard matrix. Multiplication of the de-spread data with the appropriate row of the Hadamard matrix (Walsh symbol) and summing over one Walsh symbol effectively demodulates the corresponding channel. Hadamard transform module 770 demodulates all 64 channels in one finger. Since the processing finger may process both unprocessed data and data in which interference signal(s) have been removed, a projection matrix or product of projection matrices may have to be applied to the Walsh codes prior to multiplication with the data as indicated by element 772. Output 774 of this module is the signal amplitude of each channel. It is referred to as relative channel amplitude 774 in order to emphasize that it is not necessary to know the absolute signal amplitude for the CSPE, but instead the relative amplitude between channels in the same finger is sufficient.

The generation of S module 780 has a lot of flexibility in terms of its implementation. The channels to be canceled from the data signal may be pre-set as a fixed-size subset of channels or the complete set of channels or it may be dynamically determined from the relative channel amplitude output from Hadamard transform module 770 or another criteria. For example, a threshold may be set, such that all channels above this particular threshold are selected or a fixed number of channels may be chosen such that those channels with the greatest power are selected to be included in the generation of the S matrix. A control module, such as shown in FIG. 5, element 530, also determines which method of cancellation is to be used, i.e., sign information, relative power information for the composite method, no information, or the cancellation method may be fixed by the architecture. Reference signals are generated and used as vectors in the construction of the S matrix. If the input data is processed data, then a projection matrix or product of projection matrices 772 may be applied to the reference signals. The output of module 780 is the S matrix and the projection operator constructed from S that projects a signal onto a subspace orthogonal to the subspace of S. Module 790 applies the new projection operator (denoted by '*') to the data signal. Processing finger 700 feeds the new projection operator and the processed data $y^{(1)}$ to a control module, such as shown in FIG. 5, element 530.

Figure 8:
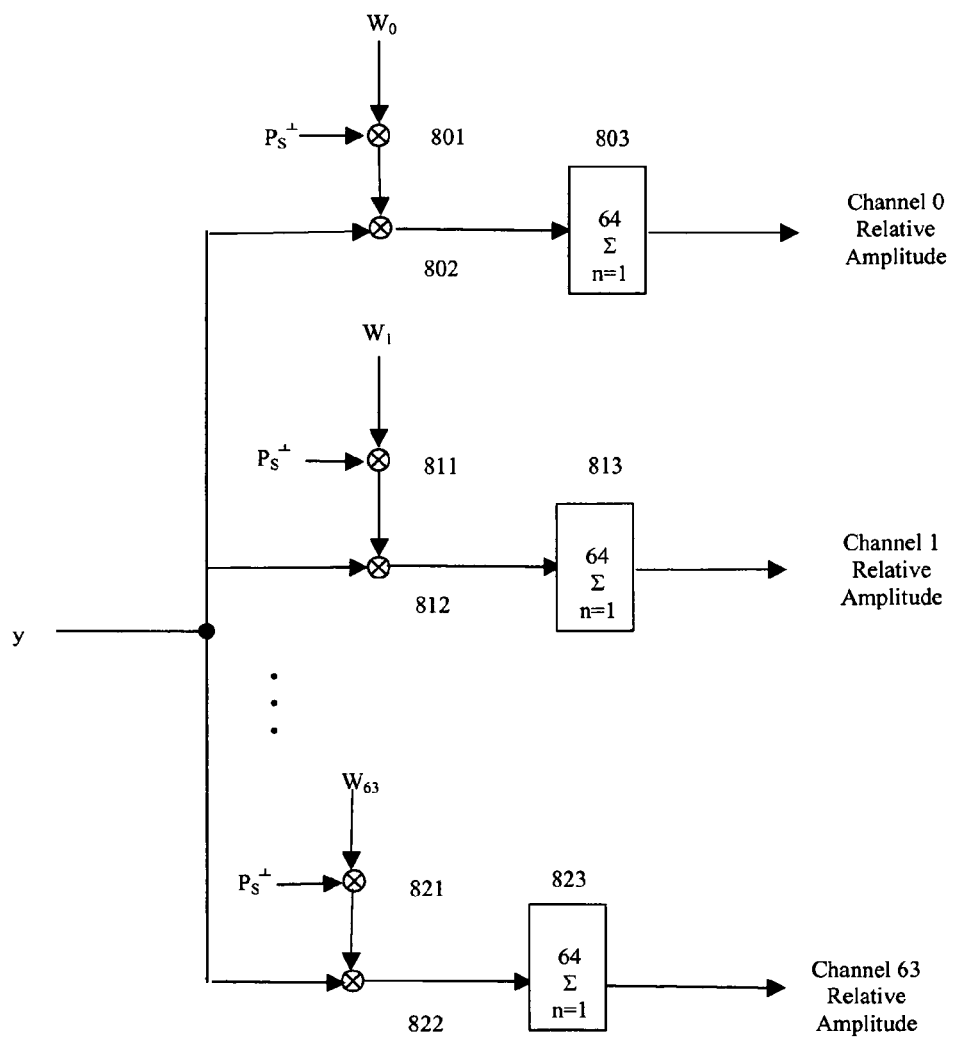
FIG. 8 is a block diagram depicting a modified Hadamard transform module that may be utilized in conjunction with the present teachings of the invention in a cdmaOne system.

In FIG. 8, a modified Hadamard Transform module 800 (such as that shown in FIG. 7, element 770) is discussed in greater detail. The input y is split into 64 paths in order to correlate it with the 64 Walsh symbols and calculate an estimate of each channel's amplitude. The 64 Walsh symbols are multiplied by the appropriate projection matrix or product of projection matrices, if necessary. For example, see 801, 811 and 821. The result is then multiplied with y in respective multipliers 802, 812 and 822 and summed over a Walsh symbol in respective summers 803, 813 and 823. The estimate of each channel's amplitude, which is output, may be incorrect by a scale factor, but the relative amplitude between channels is correct.

Figure 9:
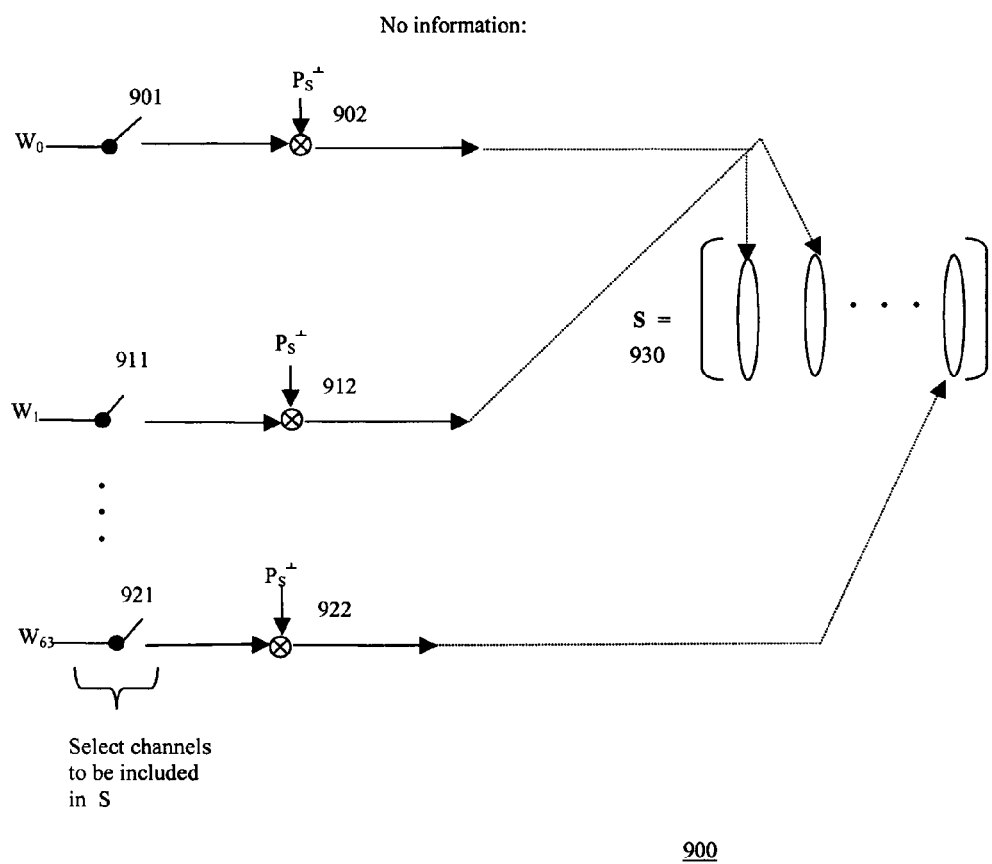
FIG. 9 is a block diagram depicting a module for the generation of an interference matrix S, using 'no information' of sign or relative amplitude, which may be utilized in conjunction with the teachings of the present invention in a cdmaOne system and/or cdma2000 system.

FIGS. 9, 10, 11 and 12 depict several examples of the generation of an S matrix. FIG. 9 depicts the generation of S matrix 900 using no information of bits transmitted or relative signal amplitude. Each channel has a selector (901, 911 and 921) that determines which Walsh symbols (channels) will be removed from the data signal. If the data has been processed, i.e., has had interference signals removed, then the appropriate projection matrix or product of projection matrices is applied to each Walsh symbol by the respective multipliers 902, 912 and 922. The reference vector output from each selected channel is included as a vector in interference matrix S 930. The ordering of the vectors does not matter.

Figure 10:
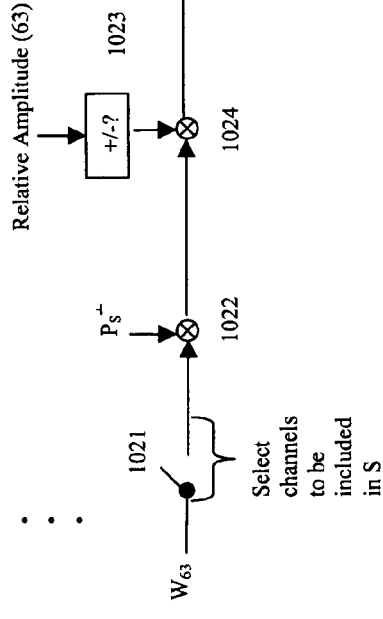
FIG. 10 is a block diagram depicting a module for the generation of an interference matrix S, using 'sign information', that may be utilized in conjunction with the teachings of the present invention in a cdmaOne system and/or cdma2000 system.

FIG. 10 depicts the generation of S matrix 1000 using sign (bit) information from each channel. Each channel has a selector (1001, 1011 and 1021) that determines which Walsh symbols will be removed from the data signal. If the data has been processed then the appropriate projection matrix or product of projection matrices is applied to each Walsh symbol by respective multipliers 1002, 1012 and 1022. Relative amplitude information is processed by a module (1003, 1013 and 1023) in each channel to determine the sign of the bit transmitted. The sign information is multiplied in respective multipliers 1004, 1014 and 1024 with the results from respective multipliers 1002, 1012 and 1022. The reference vector output from each channel is included in interference matrix S 1030. The ordering of the vectors does not matter.

Figure 11:
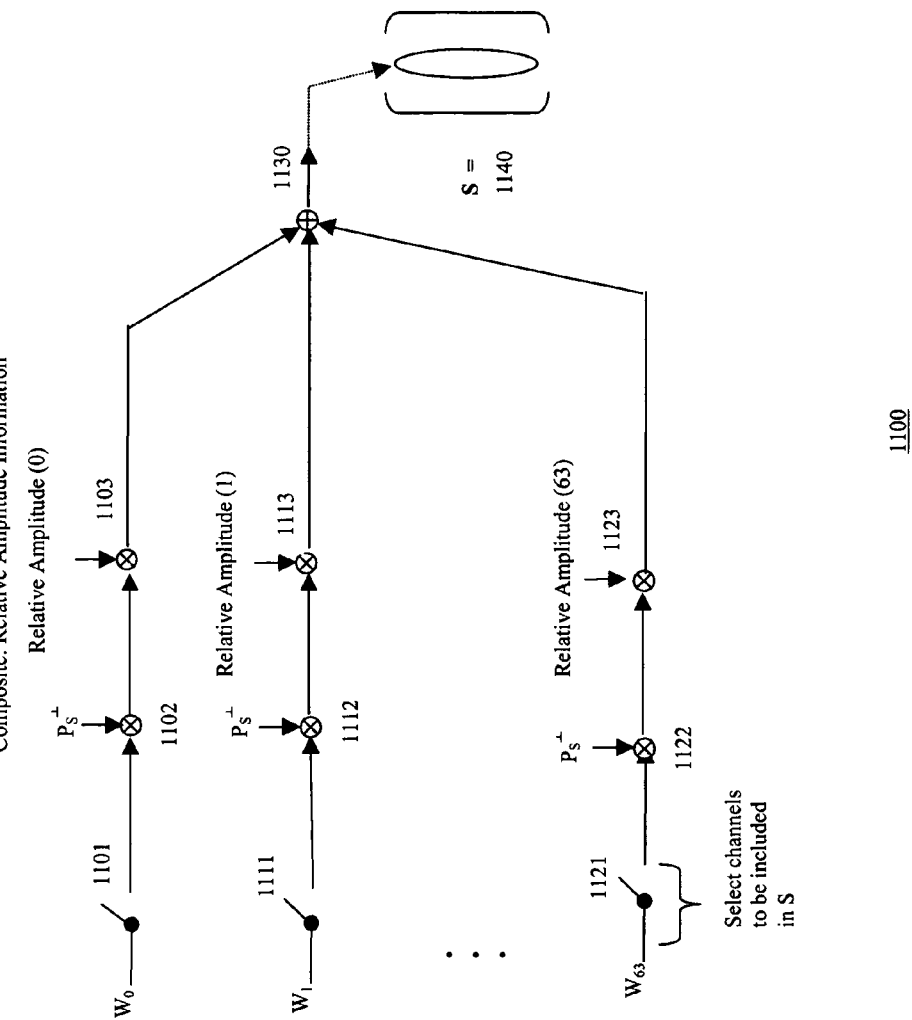
FIG. 11 is a block diagram depicting a module for the generation of an interference matrix S, using 'relative amplitude (composite)' information, which may be utilized in conjunction with the teachings of the present invention in a cdmaOne system and/or cdma2000 system.

FIG. 11 depicts the generation of S matrix 1100 using relative amplitude information from each channel in order to use the composite method of cancellation. Each channel has a respective selector (1101, 1111 and 1121) that determines which Walsh symbols will be removed from the data signal. If the data has been processed then the appropriate projection matrix or product of projection matrices is applied to each Walsh symbol by the respective multiplier 1102, 1112 and 1122. Relative amplitude information is used to scale the result in each channel by the appropriate amount with the respective multipliers 1103, 1113 and 1123. The reference vector output from each channel is added together to form a composite vector in adder 1130. The resulting composite reference vector is included in interference matrix S 1140.

Figure 12A:
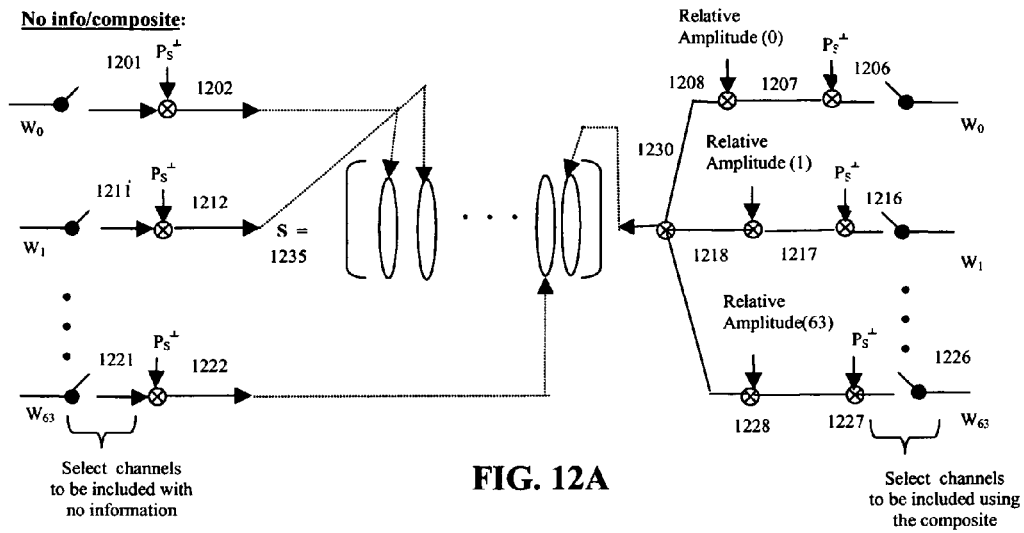
FIGS. 12A and B illustrate block diagrams which depict two examples of modules combining methods for a generation of an interference matrix S that may be utilized in conjunction with the teachings of the present invention in a cdmaOne system.
Figure 12B:
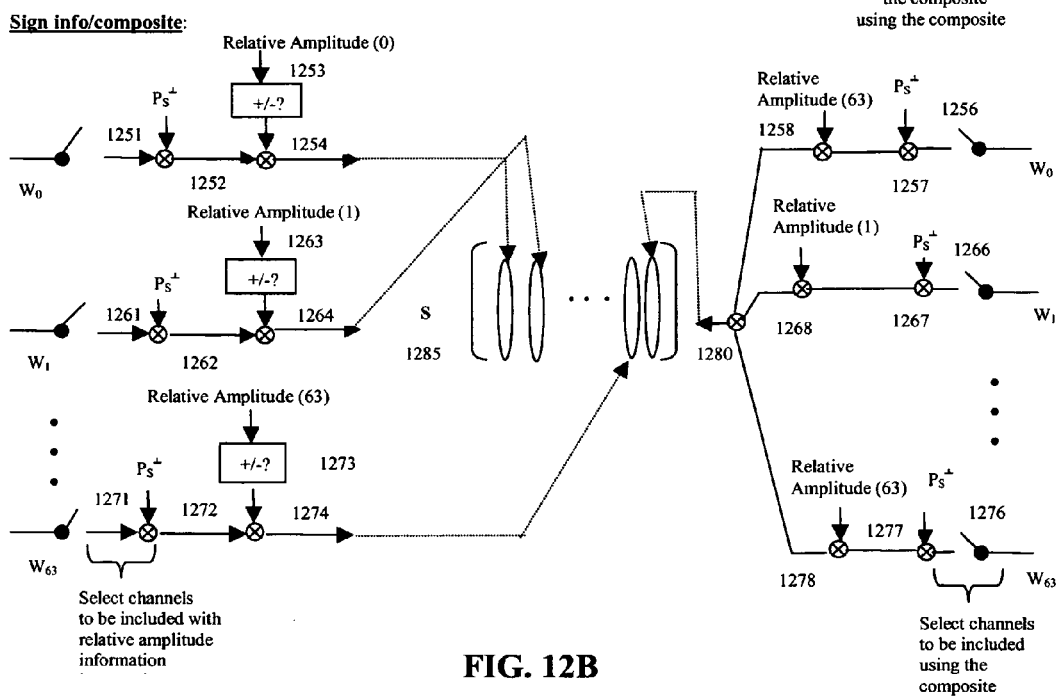

FIGS. 12A and 12B depict two examples of the generation of an S matrix, in which a combination of the above-described methods are utilized. FIG. 12A shows a combination of using no information of bits transmitted or relative signal amplitude and the composite method and FIG. 12B shows a combination of using relative amplitude information and the composite method.

In FIG. 12A, each channel has a respective selector 1201, 1211 and 1221 that determines which Walsh symbol will be removed from the data signal without using bit or relative amplitude information. If the data has been processed then the appropriate projection matrix or product of projection matrices is applied to each Walsh symbol by respective multiplier 1202, 1212 and 1222. The reference vectors output from each channel is included in the interference matrix S. Similarly, selectors 1206, 1216 and 1226 determine which Walsh symbols will be removed from the data signal using relative amplitude information and the composite method. If the data has been processed then the appropriate projection matrix or product of projection matrices is applied to each Walsh symbol by respective multiplier 1207, 1217 and 1227. Relative amplitude information is used to scale each reference vector appropriately by respective multiplier 1208, 1218 and 1228. The reference vector output from each channel is summed together by summer 1230 to form a composite vector that is included in interference matrix S 1235. The ordering of the vectors in the S matrix does not matter.

In FIG. 12B, each channel has a respective selector 1251, 1261 and 1271 that determines which Walsh symbol will be removed from the data signal using sign information. If the data has been processed then the appropriate projection matrix or product of projection matrices is applied to each Walsh symbol by respective multiplier 1252, 1262 and 1272. Relative amplitude information is processed by respective modules 1253, 1263 and 1273 in each channel to determine the sign of the bit transmitted. The sign information is multiplied by respective multipliers 1254, 1264 and 1274 with the results from multipliers 1252, 1262 and 1272. The reference vector output from each channel is included in interference matrix S 1285. Similarly, respective selectors 1256, 1266 and 1276 determine which Walsh symbols will be removed from the data signal using the relative amplitude information and the composite method. If the data has been processed then the appropriate projection matrix or product of projection matrices is applied to each Walsh symbol by respective multipliers 1257, 1267 and 1277. Relative amplitude information is used to scale each reference vector appropriately by respective multipliers 1258, 1268 and 1278. The reference vector output from each channel is summed together to form a composite vector by summer 1280. This composite vector is included in interference matrix S 1285. The ordering of the vectors does not matter.

EXAMPLE II

The following embodiment is of the cdma2000 forward link receiver. Modifications have to be made to the cdmaOne embodiment to accommodate features and enhancements made in cdma2000. Quasi-orthogonal (QOF) and concatenated functions may be used to achieve a smaller impact on the number of orthogonal codes available for traffic channels. Variable length Walsh codes are also used to attain higher data rates. Specifically, shorter Walsh codes down to 4 chips in length are used to increase the data rate. The limitation on Walsh codes is a length limit of 128 for 1× rates and 256 for 3× rates, except for the auxiliary pilot and auxiliary transmit diversity pilot channels.

Due to the varying lengths of the Walsh codes it will become increasingly important to have bit or relative amplitude information to facilitate interference cancellation. If the interference matrix contains non-pilot interference vectors composed of different length Walsh codes, it becomes imperative that the vectors of shorter length Walsh codes use either bit or relative amplitude information in order to correctly cancel interference. For information bearing channels, it is necessary for no Walsh symbol boundaries to appear in the interference matrix if no bit or relative amplitude information is used. The benefit of canceling over a single Walsh symbol is that it is not necessary to know bit or relative amplitude information. However, it may not be feasible to cancel interference over only 4 chip symbols or if there is symbol misalignment since a longer data record may provide better cancellation properties.

Cross-correlation will have to be accounted for when a mix of QOFs and variable length Walsh codes are used for channelization. While the goal is to minimize the cross-correlation between QOFs and variable length Walsh codes, the codes are not truly orthogonal and there exists a nonzero correlation. Even with perfect time alignment, QOFs are not orthogonal to the original Walsh code set. Within a QOF set, orthogonality is preserved, but there is a cross-correlation between code vectors from different sets. A critical difference is that when QOFs are used, channels within the same finger may no longer be orthogonal to each other. Therefore, the present invention may be applied to cancellation of channels within one finger.

Moreover, cdma2000 may use orthogonal transmit diversity (OTD) to mitigate multipath effects. OTD splits the transmitted symbols into two paths where each path is spread by a different Walsh code or quasi-orthogonal function associated with each antenna. As a result, the receiver architecture depicts the separation of the I and Q channels to accommodate the application of different Walsh codes, if necessary. Moreover, it emphasizes the construction of separate interference matrices for the I and Q channels for cancellation purposes.

The cdma2000 serial CSPE receiver incorporates the coded signal-processing engine (CSPE) into a cdma2000 receiver architecture in which interference cancellation is performed in a serial manner. Specifically, interference cancellation operations of single fingers, e.g., one or more channels from a LOS or multipath signal, are performed in a serial, or cascading, manner, typically ordered in terms of power from highest to lowest. Each processing finger may operate on the received data y or on processed data in which one or more interference signals have been cancelled. The benefit of this serial approach is that a serial receiver processing finger may track and demodulate a signal that may otherwise be buried beneath the interference and be undetectable to a baseline receiver. A master control module controls data flow and control signals for all processing fingers. Depending on the power of the signals that are to be acquired, the CSPE may or may not cancel the interference of the previous signal(s).

As discussed above, FIG. 5 depicts a forward link receiver 500. Forward link receiver 500 architecture is applicable to both cdmaOne and cdma2000. An RF signal received by the antenna is down-converted in 510 from RF to base-band (BB) based on the nominal carrier frequency. The present embodiment encompasses receivers that process base-band or IF signals. The base-band signal is then sampled in 520 to create a digital signal. The I and Q channels are not shown explicitly, but are implicit in all the data connections in the figure. Control module 530 feeds the digital signal into searcher 540, which acquires the strongest signal finger and communicates the short code offset and possibly the Doppler frequency and/or phase to control module 530. Searcher 540 continues to search over the code offsets in order to acquire another signal. Control module 530 feeds the data and acquisition information into one of the four processing fingers 550, 560, 570 and 580. While FIG. 5 depicts four processing fingers, the present embodiment is not limited to a specific number of processing fingers but instead applies to an arbitrary number of fingers.

Without loss of generality, suppose that the finger is assigned to finger processor 550. The finger processor tracks the finger, demodulates the signal, creates interference matrices to cancel the signal and finally removes the signal from the input data signal. The demodulated signal is fed to demodulation module 590 that performs the Rake receiver combining as needed for multipath signals. The interference matrices and processed data are fed back to control module 530.

With information from searcher 540 and the neighbor list from the finger tracked in processing finger 550, control module 530 will decide whether to track a multipath associated with the finger currently tracked in processing finger 550 or another base station. Control module 530 has searcher 540 search over the code offsets for other strong signals in either the received data or in the data with the interfering finger removed. The latter is done if the interference from the first signal is too strong to detect or adequately track another signal. Without loss of generality, the second finger is fed to finger processor 560 with data that has the strong signal removed. The signal is tracked, demodulated, interference matrices are created and the signal is removed from the input data signal. Thus, the resulting signal has the first two tracked signals removed from it in a serial manner, i.e., successive cancellations.

The process continues in a similar manner for the other finger processors. Searcher 540 may search the received data or data in which interference signal(s) have been removed in a serial manner. Multipath signals corresponding to the same base station are combined in a Rake receiver in module 590.

Figure 13:
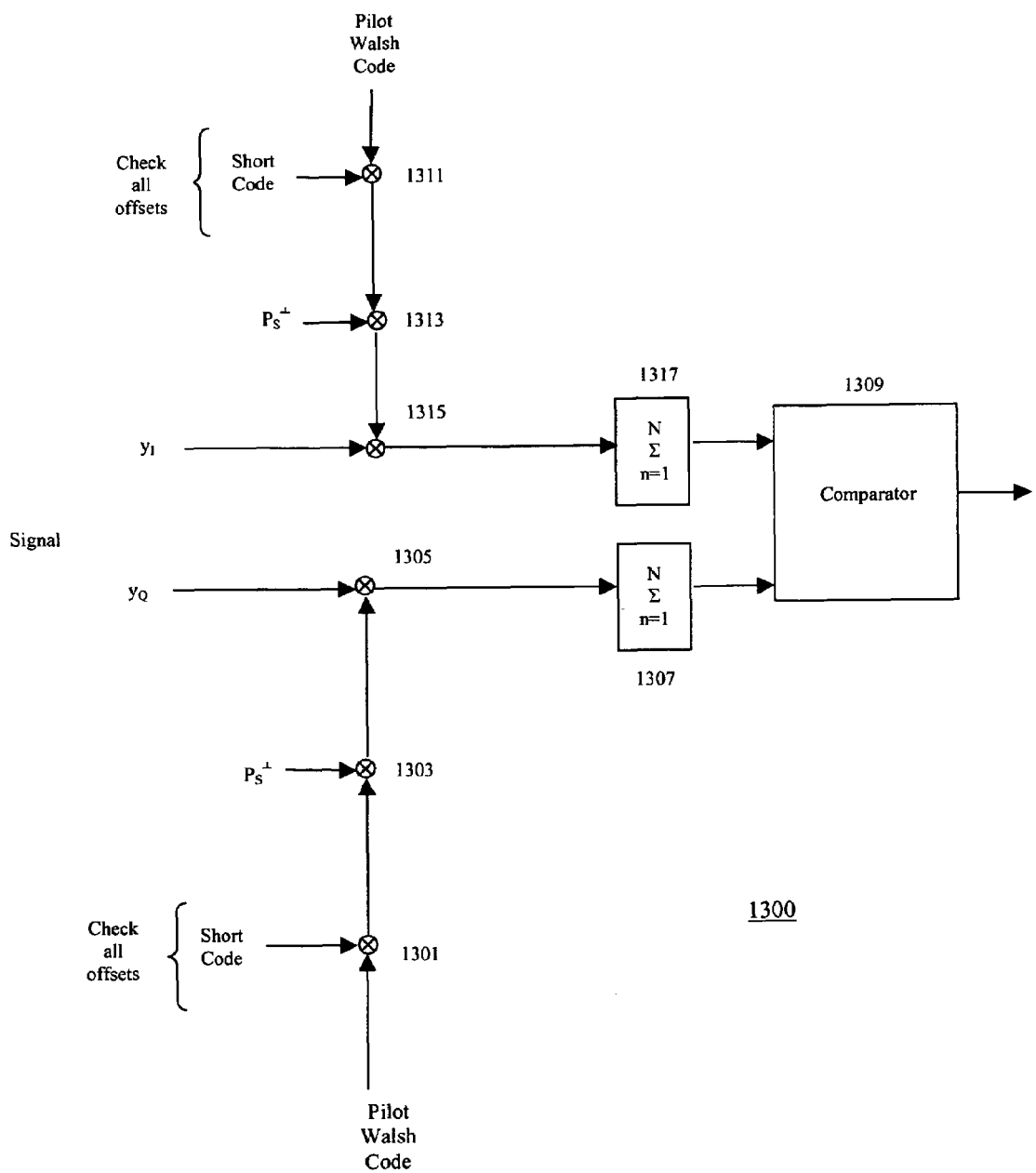
FIG. 13 is a block diagram depicting a searcher finger for the receiver illustrated in FIG. 5 and utilized in a cdma2000 system.

In FIG. 13, searcher 1300 (such as that shown in FIG. 5, element 540) is discussed in greater detail. The pilot Walsh code is multiplied by the short code by respective multipliers 1301 and 1311. If the input data y has had interference signals removed, then the products of the multiplications in multipliers 1301 and 1311 are multiplied by the corresponding projection matrices in the respective multipliers 1303 and 1313. The reference signals computed by multipliers 1303 and 1313 are multiplied in the respective multipliers 1305 and 1315 with the respective input data signals $y_I$ and $y_Q$. The correlation procedure is completed by summing the products of the I and Q channels with the reference signals over a correlation length (N chips) by respective summers 1307 and 1317. The short code multiplied in multiplication blocks 1301 and 1311 are chosen such that the reference signal checks all possible code offsets.

Comparator 1309 uses standard methods to select the strongest signal. However, if a processing finger is already tracking a signal, then that signal will not be reacquired. Moreover, if the receiver has enough signals (LOS and/or multipath signals) from one base station, the searcher may be instructed to not acquire any more multipath signals from the same base station. Depending on the searching algorithm, the control module may provide the searcher with either an unprocessed signal or one in which interference signal(s) have been removed.

Figure 14:
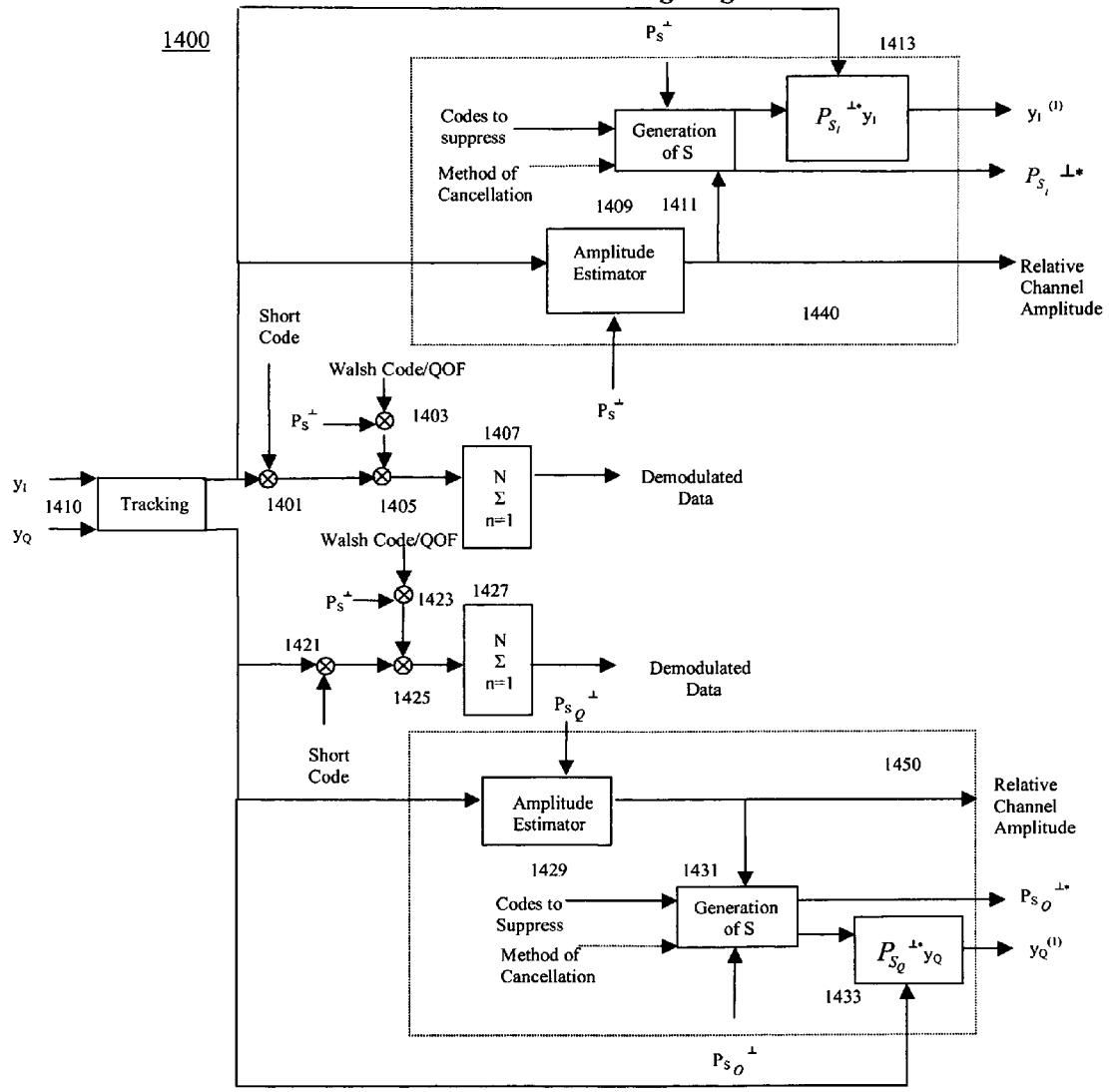
FIG. 14 is a block diagram depicting a processing finger for the receiver illustrated in FIG. 5 and utilized in a cmda2000 system.

In FIG. 14, a processing finger 1400 (such as that shown in FIG. 5, element 550) is discussed in greater detail. The parameters of the input signals $y_I$ and $y_Q$ are further refined in tracking loop(s) or parameter estimation module(s) 1410. Tracking loop(s) or estimation module(s) 1410 may include a DLL or code offset estimation, a PLL or phase estimation and/or an FLL or frequency estimation. At this point, this embodiment of the present invention differs from the standard baseline cdma2000 receiver architecture. The data flow is split between the architecture for signal demodulation and the CSPE architecture for interference cancellation in blocks 1440 and 1450.

Tracking loop(s) or parameter estimation module(s) 1410 refine the parameters for the reference signal generation used in the demodulation of the channel. After 1410, the signals are de-spread by the appropriate short code spreading sequence by respective multipliers 1401 and 1421. The Walsh code, concatenated Walsh code or quasi-orthogonal function (QOF) of the desired channel is multiplied by a projection matrix or product of projection matrices by respective multipliers 1403 and 1423, if necessary, and is then multiplied with the I and Q data signals by respective multipliers 1405 and 1425. The product of the data and the reference codes is summed by respective summers 1407 and 1427 over one Walsh or QOF symbol. The demodulated data is then fed to a demodulation module, such as shown in FIG. 5, element 590, where Rake receiver combining is performed when multipath signals from the same base station are demodulated.

Amplitude estimator modules 1409 and 1429 are applied to the de-spread I and Q data signals. Variable length Walsh codes and QOFs are used for channelization in cdma2000. Walsh codes and QOFs are derived from an orthogonal Hadamard matrix. Multiplication of the de-spread data with the appropriate symbol and summing over a symbol length effectively demodulates the corresponding channel. The amplitude estimator demodulates all channels in one finger. Since the processing finger may process both unprocessed data and data in which interference signal(s) have been removed, a projection matrix or product of projection matrices may have to be applied to the symbols prior to multiplication with the data. The output of this module is the signal amplitude of each channel. It is referred to as relative channel amplitude in order to emphasize that it is not necessary to know the absolute signal amplitude for the CSPE, but instead the relative amplitude between channels in the same finger is sufficient.

The generation of S, modules 1411 and 1431, have a lot of flexibility in terms of their implementation. The channels to be canceled from the data signal can be pre-set as a fixed-size subset of channels or the complete set of channels or it may be dynamically determined from the relative channel amplitude output from the amplitude estimator modules 1409 and 1429. For example, a threshold may be set, such that all channels above this particular threshold are selected or a fixed number of channels may be chosen such that those with the greatest power are selected to be included in the generation of the S matrix. The control module also determines which method of cancellation is to be used, i.e., sign information, relative power information for the composite method or no information, or it may be fixed in the architecture. Reference signals are generated and used as vectors in the construction of the S matrices. If the input data is processed data, then a projection matrix or product of projection matrices is applied to each of the reference signals. The output of modules 1411 and 1431 is the S matrix and the projection operator constructed from the S matrices that project the signals onto a subspace orthogonal to the subspace of each of the S matrices respectively. Modules 1413 and 1433 apply the new projection operators (denoted by '*') to the data signals. The processing finger feeds the new projection operators and the processed data $y_I^{(1)}$ and $y_Q^{(1)}$ to the control module.

In FIG. 15, amplitude estimator modules 1500 and 1550 (such as those shown in FIG. 14, elements 1409 and 1429) are discussed. The input data $y_I$ and $y_Q$ are considered separately and are correlated with Walsh and QOF symbols in order to calculate an estimate of each channel's amplitude. In the figure, the symbols are denoted by $W_i$, which represents variable length Walsh codes and QOF symbols. The symbols are multiplied by the appropriate projection matrix or product of projection matrices, if necessary. For example, see respective multipliers 1501, 1511, 1551 and 1561. The result is then multiplied with $y_I$ by respective multipliers 1503 and 1513 and with $y_Q$ by respective multipliers 1553 and 1563 and then summed over the symbol length in respective summers 1505, 1515, 1555 and 1565. The estimate of each channel's amplitude, which is output by the modules 1500 and 1550, may be off by a scale factor, but the correct relative amplitude between channels is all that is necessary.

Figure 16A:
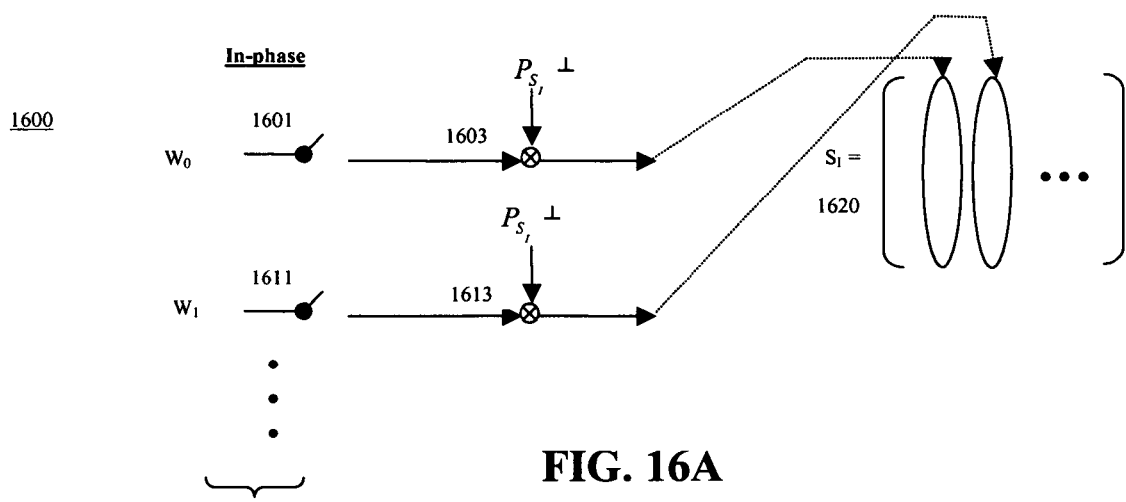
FIGS. 16A and 16B are block diagrams depicting in phase and quadrature modules for the generation of a 'no information' interference matrix S that may be utilized in conjunction with the teachings of the present invention in a cdma2000 system.
Figure 16B:
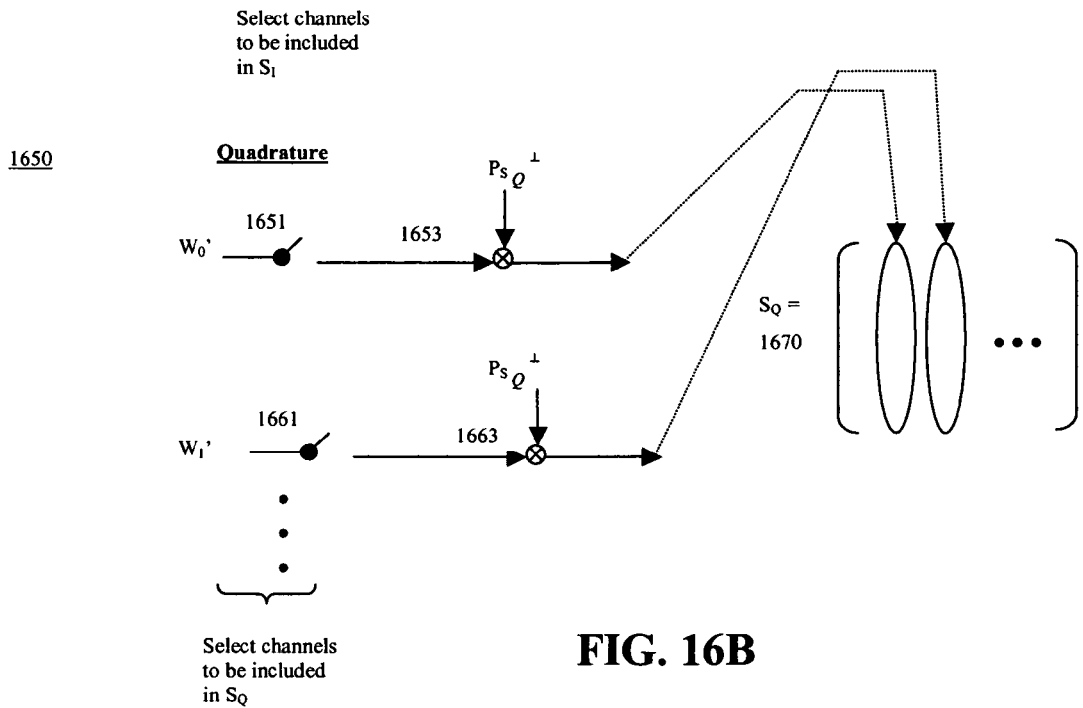

FIGS. 16A, 16B, 17A, 17B, 18A and 18B depict several examples of 'generation of S' modules. FIGS. 16A and 16B depict the generation of S matrix modules 1600 and 1650 that use no information of bits transmitted or relative signal amplitude. Each channel has a respective selector 1601, 1611, 1651 and 1661 that determines which symbols (channels) will be removed from the data signal. If the data has been processed, i.e., has had interference signals removed, then the appropriate projection matrix or product of projection matrices is applied to each symbol by respective multipliers 1603, 1613, 1653 and 1663. The reference vector output from each selected channel is included as a vector in the interference matrices $S_I$ and $S_Q$, 1620 and 1670, respectively. The ordering of the vectors in the S matrices does not matter.

Figure 17A:
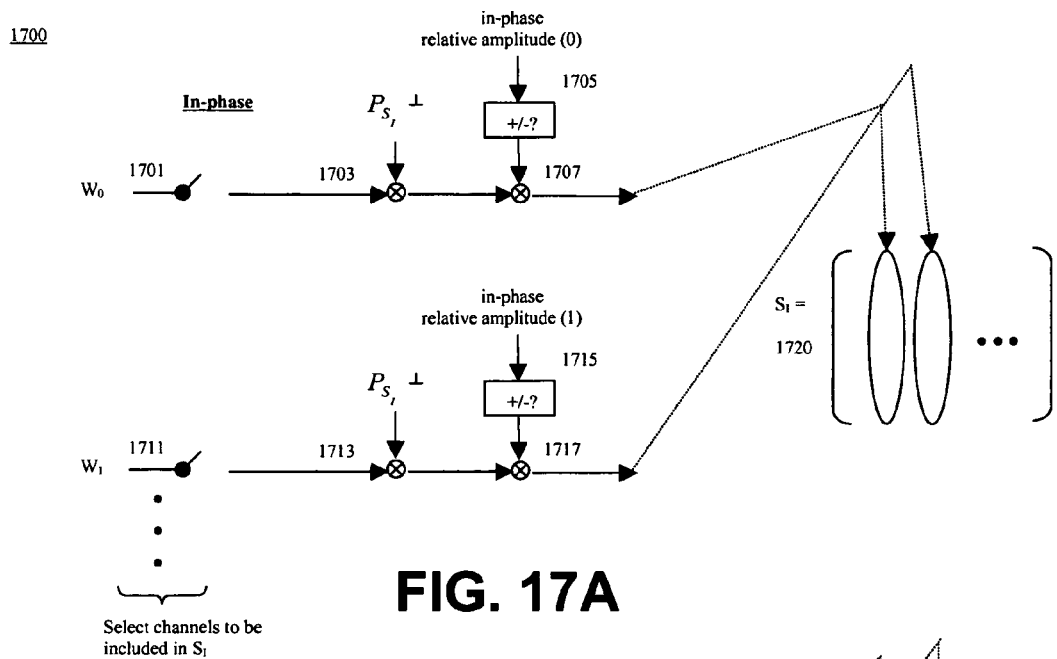
FIGS. 17A and 17B are block diagrams depicting in phase and quadrature modules for the generation of a 'sign information' interference matrix S that may be utilized in conjunction with the teachings of the present invention in a cdma2000 system.
Figure 17B:
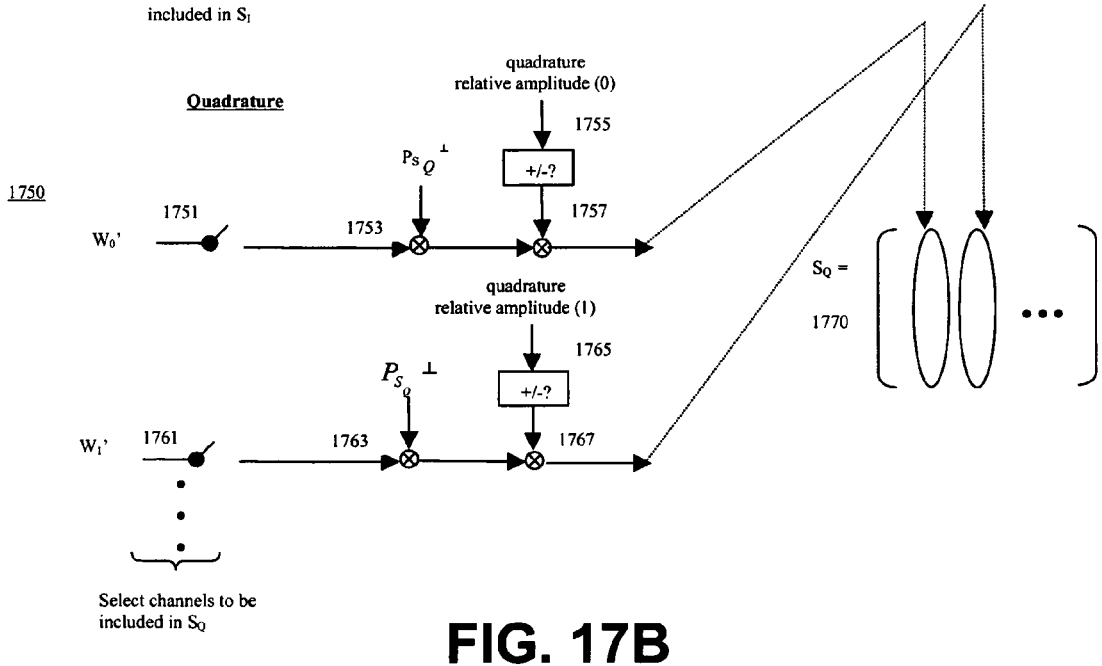

FIGS. 17A and 17B depict generation of S matrix modules 1700 and 1750 using sign (bit) information from each channel. Each channel has a respective selector 1701, 1711, 1751 and 1761 that determines which symbols (channels) will be removed from the data signals. If the data has been processed then the appropriate projection matrix or product of projection matrices is applied to each symbol by respective multipliers 1703, 1713, 1753 and 1763. Relative amplitude information is processed by a respective amplitude module 1705, 1715, 1755 and 1765 in each channel to determine the sign of the bit transmitted. The sign information multiplies the symbols in respective multipliers 1707, 1717, 1757 and 1767. The reference vector output from each channel is included in the interference matrices $S_I$ and $S_Q$, 1720 and 1770, respectively. The ordering of the vectors does not matter.

Figure 18A:
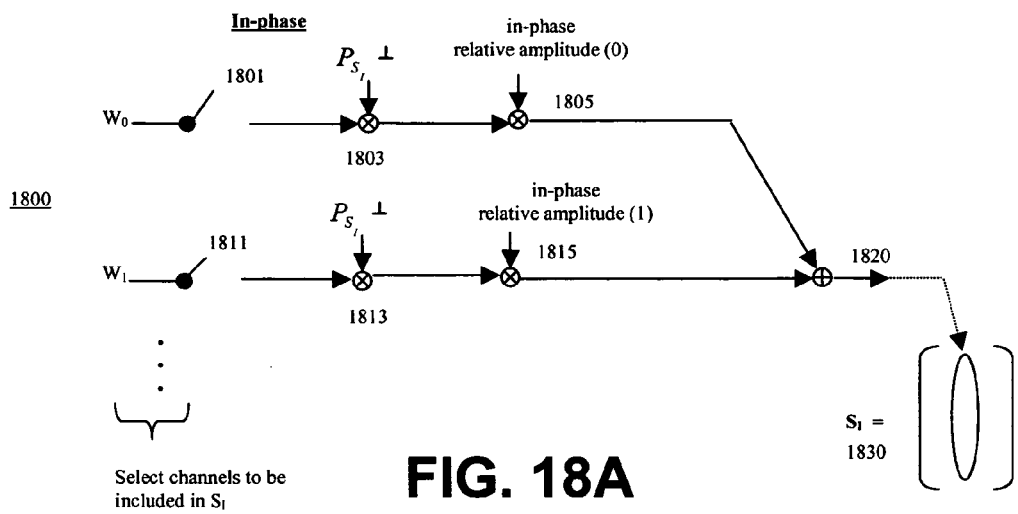
FIGS. 18A and 18B are block diagrams depicting in phase and quadrature modules for the generation of 'relative amplitude (composite)' interference matrix S that may be utilized in conjunction with the teachings of the present invention in a cdma2000 system.
Figure 18B:
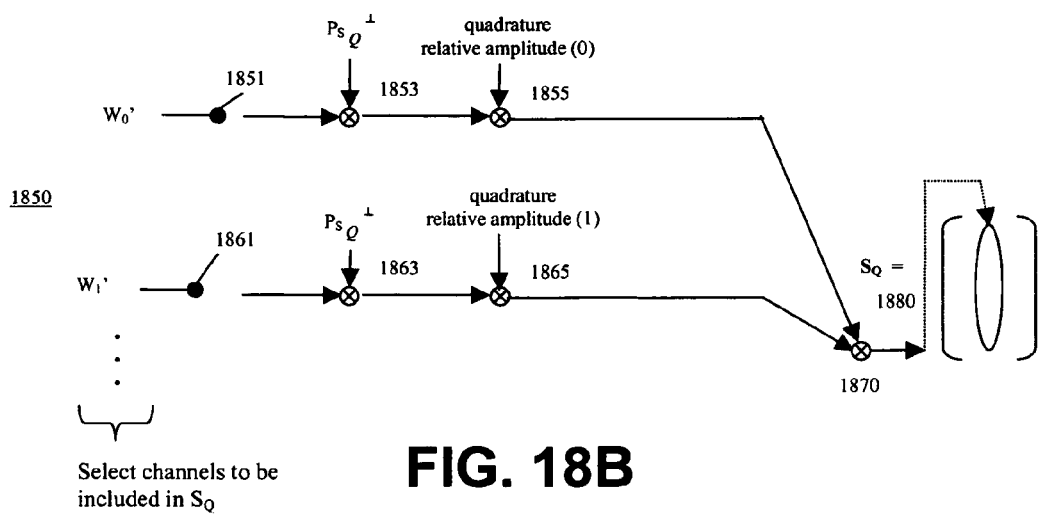

FIGS. 18A and 18B depict generation of S matrix modules 1800 and 1850 using relative amplitude information from each channel in order to use the composite method of cancellation. Each channel has a respective selector 1801, 1811, 1851 and 1861 that determines which symbols will be removed from the data signals. If the data has been processed then the appropriate projection matrix or product of projection matrices is applied to each symbol by respective multipliers 1803, 1813, 1853 and 1863. Relative amplitude information is used to scale the result in each channel by respective multipliers 1805, 1815, 1855 and 1865 by an appropriate amount. The reference vector output from each channel is added together to form a composite vector by respective adders 1820 and 1870 for the I and Q channels respectively. The resulting composite reference vectors are used to construct the $S_I$ and $S_Q$ interference matrices, 1830 and 1880, respectively.

The methods for constructing S matrices may be combined in the manner of FIG. 12, provided for the cdmaOne embodiment, for example, by combining the composite method with either the method using bit information or the method using neither bit nor relative signal amplitude.

The methods and apparatus of the present invention may be applied to other CDMA communication embodiments, e.g., WCDMA. Moreover, the present invention may be applied to global positioning systems, radar and optics.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for generating an interference cancelled signal, comprising:

A. providing for determining which of a plurality of input signals to utilize for generating an interference matrix to produce a plurality of selected signals;

B. providing for determining the order of cancellation of the said plurality of selected signals based at least in part on the strengths of the said plurality of selected signals; and C. providing for sequentially cancelling the said plurality of selected signals from at least one of the said plurality of input signals to obtain an interference cancelled signal.

2. An apparatus configured for generating an interference cancelled signal, comprising:

a plurality of power estimators configured for computing power estimates of components of a received signal;

a control block coupled to the said plurality of power estimators configured to determine an order of cancellation of the said components of a received signal based at least in part on the said power estimates; and a plurality of processing fingers coupled to the said control block configured for generating at least one interference cancelled signal stream.

3. The apparatus recited in claim 2 wherein the plurality of processing fingers comprises at least one Hadamard transform module configured to compute the amplitudes of a plurality of channels.

4. The apparatus recited in claim 2, wherein the said plurality of processing fingers comprises a de-spreader for despreading an input signal.

5. A method for generating an S matrix, comprising:
A. providing for determining which of a plurality of input signals to utilize for generating the S matrix to produce a plurality of selected input signals;
B. providing for multiplying each of the plurality of selected input signals with a projection matrix $P_s^\perp$ to generate a plurality of intermediate signals, each of the plurality of intermediate signals having an associated one of the plurality of selected input signals;
C. providing for determining a sign for each of the plurality of selected input signals;
D. providing for multiplying each of the plurality of intermediate signals with the sign of its associated one of the plurality of selected input signals to generate a plurality of columns of the S matrix; and
E. providing for storing the plurality of columns to form the S matrix.

6. The method recited in claim 5 wherein providing for determining the sign includes providing for utilizing relative amplitude information associated with the plurality of selected input signals to determine the sign.

7. An apparatus configured for generating an S matrix, comprising:
A. a selection means configured for determining which of a plurality of input signals to utilize for generating the S matrix to produce a plurality of selected input signals;
B. a first multiplication means configured for multiplying each of the plurality of selected input signals with a projection matrix $P_s^\perp$ to generate a plurality of intermediate signals, each of the plurality of intermediate signals having an associated one of the plurality of selected input signals;
C. a sign-determination means configured for determining a sign for each of the plurality of selected input signals;
D. a second multiplication means configured for multiplying each of the plurality of intermediate signals with the sign of its associated one of the plurality of selected input signals to generate a plurality of columns of the S matrix; and
E. a storage means configured for storing the plurality of columns to form the S matrix.

8. The apparatus recited in claim 7 wherein the sign-determination means is configured to utilize relative-amplitude information associated with the plurality of selected input signals to determine the sign.

9. The apparatus recited in claim 7, wherein the plurality of input signals comprises up to 64 input signals.

10. The apparatus recited in claim 7, wherein the first multiplication means further comprises a selective-engagement means configured for determining whether or not to multiply each of the plurality of selected input signals with the projection matrix $P_s^\perp$.

11. The apparatus recited in claim 7, wherein the second multiplication means further comprises a selective-engagement means configured for determining whether to multiply each of the plurality of intermediate signals with the sign of its associated one of the plurality of selected input signals.

12. A method for generating an S matrix comprising:
A. providing for determining which of a plurality of input signals to utilize for generating the S matrix to produce a plurality of selected input signals;
B. providing for multiplying each of the plurality of selected input signals with a projection matrix $P_s^\perp$ to generate a plurality of intermediate signals, each of the plurality of intermediate signals having an associated one of the plurality of selected input signals;
C. providing for determining a relative amplitude for each of the plurality of selected input signals;
D. providing for multiplying each of the plurality of intermediate signals with the relative amplitude of its associated one of the plurality of selected input signals to generate a plurality of columns of the S matrix; and
E. providing for storing the plurality of columns to form the S matrix.

13. An apparatus configured for generating an S matrix comprising:
a selection means for determining which of a plurality of input signals to utilize for generating the S matrix to produce a plurality of selected input signals;
a first multiplication means configured for multiplying each of the plurality of selected input signals with a projection matrix $P_s^\perp$ to generate a plurality of intermediate signals, each of the plurality of intermediate signals having an associated one of the plurality of selected input signals;
an amplitude-determination means configured for determining a relative amplitude for each of the plurality of selected input signals;
a second multiplication means configured for multiplying each of the plurality of intermediate signals with the relative amplitude of its associated one of the plurality of selected input signals to generate a plurality of columns of the S matrix; and
a storage means configured for storing the plurality of columns to form the S matrix.

14. The apparatus recited in claim 13, wherein the plurality of input signals comprises up to 64 input signals.

15. The apparatus recited in claim 13, wherein the first multiplication means further comprises a selective-engagement means configured for determining whether or not to multiply each of the plurality of selected input signals with the projection matrix $P_s^\perp$.

16. The apparatus recited in claim 13, wherein the second multiplication means further comprises a selective-engagement means configured for determining whether to multiply each of the plurality of intermediate signals with the relative amplitude of its associated one of the plurality of selected input signals.

17. A method for generating an S matrix comprising:
A. providing for determining which of a plurality of input signals to utilize for generating the S matrix to produce a plurality of selected input signals;
B. providing for multiplying each of the plurality of selected input signals with a projection matrix $P_s^\perp$ to generate a first plurality of S-matrix columns and a plurality of intermediate signals, each of the plurality of intermediate signals having an associated one of the plurality of selected input signals;
C. providing for determining at least one of a sign and a relative amplitude for each of the plurality of selected input signals;
D. providing for multiplying each of the plurality of intermediate signals with at least one of the sign and the

37 relative amplitude of its associated one of the plurality of selected input signals to generate a plurality of intermediate columns;

E. providing for summing the plurality of intermediate columns to generate at least one additional S-matrix column; and F. providing for storing the first plurality of S-matrix columns and the at least one additional S-matrix column to form the S matrix.

18. An apparatus configured for generating an S matrix, comprising:
a selection means configured for determining which of a plurality of input signals to utilize for generating the S matrix to produce a plurality of selected input signals;
a first multiplication means configured for multiplying each of the plurality of selected input signals with a projection matrix $P_s^\perp$ to generate a first plurality of S-matrix columns and a plurality of intermediate signals, each of the plurality of intermediate signals having an associated one of the plurality of selected input signals;
a determination means configured for determining at least one of a sign and a relative amplitude for each of the plurality of selected input signals;
a second multiplication means configured for multiplying each of the plurality of intermediate signals with at least one of the sign and the relative amplitude of its associated one of the plurality of selected input signals to generate a plurality of intermediate columns;
a summing means configured for summing the plurality of intermediate columns to generate at least one additional S-matrix column; and
a storage means configured for storing the first plurality of S-matrix columns and the at least one additional S-matrix column to form the S matrix.

19. The apparatus recited in claim 18 wherein the plurality of input signals comprises up to 64 input signals.

20. The apparatus recited in claim 18, wherein the first multiplication means further comprises a selective-engagement means configured for determining whether or not to multiply each of the plurality of selected input signals with the projection matrix $P_s^\perp$.

21. The apparatus recited in claim 18, wherein the second multiplication means further comprises a selective-engagement means configured for determining whether to multiply each of the plurality of intermediate signals with at least one of the sign and the relative amplitude of its associated one of the plurality of selected input signals.

22. A method for generating an S matrix, comprising:
A. providing for determining which of a plurality of input signals to utilize for generating the S matrix to produce a plurality of selected input signals;
B. providing for multiplying each of the plurality of selected input signals with a projection matrix $P_s^\perp$ to generate at least one column of the S matrix;
C. providing for multiplying each of the plurality of selected input signals with a projection matrix $P_s^\perp$ to generate a plurality of intermediate signals, each of the plurality of intermediate signals having an associated one of the plurality of selected input signals;
D. providing for determining a relative amplitude for each of the plurality of selected input signals;
E. providing for multiplying each of the plurality of intermediate signals with the relative amplitude of its associated one of the plurality of selected input signals to generate a plurality of intermediate columns of the S matrix;

F. providing for summing the plurality of intermediate columns to generate at least one column of the S matrix; and G. providing for storing the at least one column of the S matrix to form the S matrix.

23. The method recited in claim 22, wherein providing for multiplying each of the plurality of selected input signals with the projection matrix $P_{s\perp}$ further comprises providing for determining whether to multiply each of the plurality of selected input signals with the projection matrix $P_s^\perp$.

24. An apparatus for generating an S matrix, comprising:
a selection means configured for determining which of a plurality of input signals to utilize for generating an S matrix to produce a plurality of selected input signals;
a first multiplication means configured for multiplying each of the plurality of selected input signals with a projection matrix $P_s^\perp$ to generate a plurality of columns of the S matrix and a plurality of intermediate signals, each of the plurality of intermediate signals having an associated one of the plurality of selected input signals;
an amplitude-determination means configured for determining a relative amplitude for each of the plurality of selected input signals;
a second multiplication means configured for multiplying each of the plurality of intermediate signals with the relative amplitude of its associated one of the plurality of selected input signals to generate a plurality of intermediate columns;
a summing means configured for summing the plurality of intermediate columns to generate at least one column of the S matrix; and
a storage means configured for storing the at least one column of the S matrix to form the S matrix.

25. The apparatus recited in claim 24, wherein the plurality of input signals comprises up to 64 input signals.

26. The apparatus recited in claim 24, wherein the first multiplication means further comprises a selective-engagement means configured for determining whether or not to multiply each of the plurality of selected input signals with the projection matrix $P_s^\perp$.

27. The apparatus recited in claim 24, wherein the second multiplication means further comprises a selective-engagement means configured for determining whether to multiply each of the plurality of intermediate signals with at least one of the sign and the relative amplitude of its associated one of the plurality of selected input signals.

28. A serial receiver for a wireless communication system, said communication system comprising:
a receiver means configured for receiving a signal y having a plurality of data parameters;
a plurality of fingers comprising at least one search finger and at least one tracking finger;
a control processor configured for receiving the signal y and the plurality of data parameters, said control processor configured for selecting which of the plurality data parameters to be sent to each of the plurality of fingers;
at least one correlator residing in said at least one tracking finger, said at least one correlator being configured to correlate said signal y with a reference signal $s_n$;
a Coded Signal Processing Engine (CSPE) residing in said at least one tracking finger and configured for performing interference cancellation in the signal y, said CSPE comprising: an apparatus configured for generating a projection from the signal y, signal y comprising, a spread signal matrix $s_i$ of the source of interest, signals of other interfering sources $s_1, s_2, s_3 \ldots, s_p$; and noise n.

29. The serial receiver recited in claim 28, wherein the receiver means is further configured to divide the signal y into $y_i$ channel and a $y_Q$ channel.

30. The serial receiver recited in claim 29, wherein said at least one search finger comprises at least a first multiplier and a second multiplier, a summer for each of the $y_i$ and a $y_Q$ channels, and a comparator.

31. The serial receiver recited in claim 30, wherein in the $y_i$ channel said first multiplier is configured to multiply a pilot Walsh code with a short code to generate a first reference signal if the Walsh code is non-zero.

32. The serial receiver recited in claim 31, wherein said second multiplier is configured to multiply the first reference signal by an orthogonal projection matrix to generate a second reference signal with at least one interference signal removed.

33. The serial receiver recited in claim 32 further comprising a third multiplier configured to multiply the second reference signal with the signal $y_i$ to generate an intermediate signal.

34. The serial receiver recited in claim 33, wherein the intermediate signal is correlated by summing the product of $y_i$ and the second reference signal over a correlation length N in said summer to generate a first plurality of summation signals.

35. The serial receiver recited in claim 34 wherein in the $y_Q$ channel, said first multiplier is configured to multiply a pilot Walsh code with a short code to generate a first reference signal if the Walsh code is non-zero.

36. The serial receiver recited in claim 35, wherein said second multiplier is configured to multiply the first reference signal by a respective orthogonal projection matrix to generate a second reference signal having at least one interference signal removed.

37. The serial receiver recited in claim 36, wherein said third multiplier is configured to multiply the second reference signal with the signal $y_Q$ to generate a second intermediate signal.

38. The serial receiver recited in claim 37, wherein the second intermediate signal is correlated by summing the product of $y_Q$ and the second reference signal over a correlation length N in said summer to generate a second plurality of summation signals.

39. The serial receiver recited in claim 38, wherein said comparator is configured to process the first plurality of summation signals and the second plurality of summation signals to select a strongest summation signal.

40. A method for generating an S matrix, said S matrix having an in-phase S-matrix component and a quadrature-phase S-matrix component, said method comprising:
   A. providing for determining which in-phase components of a plurality of input signals to utilize for generating the in-phase S matrix component for producing a plurality of selected in-phase input-signal components;
   B. providing for multiplying each of the plurality of selected in-phase input-signal components with a projection matrix $P_{s_I}^\perp$ to generate a plurality of in-phase S-matrix columns;
   C. providing for storing the plurality of in-phase S-matrix columns to form the in-phase S matrix;
   D. providing for determining which quadrature-phase components of the plurality of input signals to utilize for generating the quadrature-phase S matrix component for producing a plurality of selected quadrature-phase input-signal components;
   E. providing for multiplying each of the plurality of selected quadrature-phase input-signal components with a projection matrix $P_{s_Q}^\perp$ to generate a plurality of quadrature-phase S-matrix columns; and
   F. providing for storing the plurality of quadrature-phase S matrix to form the quadrature-phase S matrix.

41. The method recited in claim 40 wherein providing for multiplying each of the plurality of selected in-phase input-signal components with a projection matrix $P_{s_I}^\perp$ further comprises providing for determining whether to multiply the respective selected input signal with said projection matrix $P_{s_I}^\perp$.

42. The method recited in claim 40 wherein providing for multiplying each of the plurality of selected in-phase input-signal components with a projection matrix $P_{s_Q}^\perp$ further comprises providing for determining whether to multiply the respective selected input signal with said projection matrix $P_{s_Q}^\perp$.

43. An apparatus configured to generate an S matrix, said S matrix having an in-phase S-matrix component and a quadrature-phase S-matrix component, said apparatus comprising:
   a first selection means configured for determining which in-phase components of a plurality of input signals to utilize for generating the in-phase S-matrix component for producing a plurality of selected in-phase input-signal components;
   a first multiplication means configured for multiplying each of the plurality of selected in-phase input signal components with a projection matrix $P_{s_I}^\perp$ to generate a plurality of in-phase S-matrix columns;
   a first storage means configured for storing the plurality of in-phase S-matrix columns to form the in-phase S-matrix component;
   a second selection means configured for determining which quadrature-phase components of the plurality of input signals to utilize for generating the quadrature-phase S matrix component for producing a plurality of selected quadrature-phase input signal components;
   a second multiplication means configured for multiplying each of the plurality of selected quadrature-phase input signal components with a projection matrix $P_{s_Q}^\perp$ to generate a plurality of quadrature-phase S-matrix columns; and
   a second storage means configured for storing the plurality of quadrature-phase S matrix columns to form the quadrature-phase S-matrix component.

44. The apparatus recited in claim 43 wherein the plurality of input signals comprises up to 64 input signals.

45. The apparatus recited in claim 43, wherein the first multiplication means further comprises a selective-engagement means configured for determining whether or not to multiply each of the plurality of selected input signals with the projection matrix $P_{s_I}^\perp$.

46. The apparatus recited in claim 43, wherein the second multiplication means further comprises a selective-engagement means configured for determining whether or not to multiply each of the plurality of selected input signals with the projection matrix $P_{s_Q}^\perp$.

47. A method for generating an S matrix, said S matrix having an in-phase S-matrix component and a quadrature-phase S-matrix component, said method comprising:
   A. providing for determining which in-phase components of a plurality of input signals to utilize for generating the in-phase S-matrix component for producing a plurality of selected in-phase input-signal components;

B. providing for multiplying each of the plurality of selected in-phase input-signal components with a projection matrix $P_{s_I}^\perp$ to generate a plurality of in-phase intermediate signals, each of the plurality of in-phase intermediate signals having an associated one of the plurality of selected in-phase input-signal components;

C. providing for utilizing relative amplitude information associated with each of the plurality of selected in-phase input-signal components to determine an in-phase input-signal component sign of each of the plurality of selected in-phase input-signal components;

D. providing for multiplying each of the plurality of in-phase intermediate signals with the in-phase input-signal component sign of its associated one of the plurality of selected in-phase input-signal components to generate a plurality of in-phase S-matrix columns;

E. providing for storing the plurality of in-phase S-matrix columns to form the in-phase S-matrix component;

F. providing for determining which quadrature-phase components of the plurality of input signals to utilize for generating the quadrature-phase S-matrix component for producing a plurality of selected quadrature-phase input-signal components;

G. providing for multiplying each of the plurality of selected quadrature-phase input-signal components with a projection matrix $P_{s_Q}^\perp$ to generate a plurality of quadrature-phase S-matrix columns;

H. providing for utilizing relative amplitude information associated with each of the plurality of selected quadrature-phase input-signal components to determine a quadrature-phase input-signal component sign of each of the plurality of selected quadrature-phase input-signal components;

I. providing for multiplying each of the plurality of quadrature-phase intermediate signals with the quadrature-phase input-signal component sign of its associated one of the plurality of selected quadrature-phase input-signal components to generate a plurality of quadrature-phase S-matrix columns; and J. providing for storing the plurality of quadrature-phase S matrix to form the quadrature-phase S matrix.

48. The method recited in claim 47 wherein providing for multiplying each of the plurality of selected in-phase input-signal components with a projection matrix $P_{s_I}^\perp$ further comprises providing for determining whether to multiply the respective selected input signal with said projection matrix $P_{s_I}^\perp$.

49. The method recited in claim 47 wherein providing for multiplying each of the plurality of selected in-phase input-signal components with a projection matrix $P_{s_Q}^\perp$ further comprises providing for determining whether to multiply the respective selected input signal with said projection matrix $P_{s_Q}^\perp$.

50. An apparatus configured to generate an S matrix, the S matrix having an in-phase S-matrix component and a quadrature-phase S-matrix component, said apparatus comprising:

a selection means configured for determining which in-phase components of a plurality of input signals to utilize for generating the in-phase S-matrix component for producing a plurality of selected input signals and a plurality of selected in-phase input-signal components;

a first multiplication means configured for multiplying each of the plurality of selected in-phase input-signal components with a projection matrix $P_{s_I}^\perp$ to generate a plurality of in-phase intermediate signals, each of the plurality of in-phase intermediate signals having an associated one of the plurality of selected in-phase input-signal components;

a first sign-determination means configured for utilizing relative amplitude information associated with each of the plurality of selected in-phase input-signal components to determine an in-phase input-signal component sign of each of the plurality of selected in-phase input-signal components;

a second multiplication means configured for multiplying each of the plurality of in-phase intermediate signals with the in-phase input-signal component sign of its associated one of the plurality of selected in-phase input-signal components to generate a plurality of in-phase S-matrix columns;

a first storage means configured for storing the plurality of in-phase S-matrix columns to form the in-phase S-matrix component;

a third multiplication means configured for multiplying each of a plurality of quadrature-phase components of the plurality of selected input signals with a projection matrix $P_{s_Q}^\perp$ to generate a plurality of quadrature-phase S-matrix columns;

a second sign-determination means configured for utilizing relative amplitude information associated with each of the plurality of selected quadrature-phase input-signal components to determine a quadrature-phase input-signal component sign of each of the plurality of selected quadrature-phase input-signal components;

a fourth multiplication means configured for multiplying each of the plurality of quadrature-phase intermediate signals with the quadrature-phase input-signal component sign of its associated one of the plurality of selected quadrature-phase input-signal components to generate a plurality of quadrature-phase S-matrix columns; and a second storage means configured for storing the plurality of quadrature-phase S matrix to form the quadrature-phase S-matrix component.

51. The apparatus recited in claim 50, wherein the plurality of input signals comprises up to 64 input signals.

52. The apparatus recited in claim 50, wherein the first multiplication means further comprises a selective-engagement means configured for determining whether or not to multiply each of the plurality of selected input signals with the projection matrix $P_{s_I}^\perp$.

53. The apparatus recited in claim 50, wherein the third multiplication means further comprises a selective-engagement means configured for determining whether or not to multiply each of the plurality of selected input signals with the projection matrix $P_{s_Q}^\perp$.

54. The apparatus recited in claim 50, wherein the second multiplication means further comprises a selective-engagement means configured for determining whether or not to multiply each of the plurality of in-phase intermediate signals with the in-phase input-signal component sign of its associated one of the plurality of selected in-phase input-signal components.

55. The apparatus recited in claim 50, wherein the fourth multiplication means further comprises a selective-engagement means configured for determining whether or not to multiply each of the plurality of quadrature-phase intermediate signals with the quadrature-phase input-signal component sign of its associated one of the plurality of selected quadrature-phase input-signal components.

56. A method for generating an S matrix, said S matrix having an in-phase S-matrix component and a quadrature-phase S-matrix component, said method comprising:
   A. providing for determining which in-phase components of a plurality of input signals to utilize for generating the in-phase S-matrix component for producing a plurality of selected in-phase input-signal components;
   B. providing for multiplying each of the plurality of selected in-phase input-signal components with a projection matrix $P_{s_I}$ to generate a plurality of in-phase intermediate signals, each of the plurality of in-phase intermediate signals having an associated one of the plurality of selected in-phase input-signal components;
   C. providing for determining a relative amplitude for each of the plurality of selected in-phase input-signal components;
   D. providing for multiplying each of the plurality of in-phase intermediate signals with the relative amplitude of its associated one of the plurality of selected in-phase input-signal components to generate a plurality of columns of the in-phase S-matrix component;
   E. providing for summing each of the plurality of columns of the in-phase S-matrix component to generate an in-phase composite column;
   F. providing for storing said in-phase composite column to form the in-phase S-matrix component;
   G. providing for determining which quadrature-phase components of the plurality of input signals to utilize for generating the quadrature-phase S-matrix component for producing a plurality of selected quadrature-phase input-signal components;
   H. providing for multiplying each of the plurality of selected quadrature-phase input-signal components with a projection matrix $P_{s_Q}^\perp$ to generate a quadrature-phase intermediate signal, each of the plurality of quadrature-phase intermediate signals having an associated one of the plurality of selected quadrature-phase input-signal components;
   I. providing for determining a relative amplitude for each of the plurality of selected quadrature-phase input-signal components;
   J. providing for multiplying each of the plurality of quadrature-phase intermediate signals with the relative amplitude of its associated one of the plurality of selected quadrature-phase input-signal components to generate a plurality of columns of the quadrature-phase S-matrix component;
   K. providing for summing each of the plurality of columns of the quadrature-phase S-matrix component to generate a quadrature-phase composite column; and
   L. providing for storing said quadrature-phase composite column to form the quadrature-phase S-matrix component.

57. An apparatus configured to generate an S matrix, said S matrix having an in-phase S-matrix component and a quadrature-phase S-matrix component, said apparatus comprising:
   a first selection means configured for determining which in-phase components of a plurality of input signals to utilize for generating the in-phase S-matrix component for producing a plurality of selected in-phase input-signal components;
   a first multiplication means configured for multiplying each of the plurality of selected in-phase input-signal components with a projection matrix $P_{s_I}^\perp$ to generate a plurality of in-phase intermediate signals, each of the plurality of in-phase intermediate signals having an associated one of the plurality of selected in-phase input-signal components;
   a first amplitude-determination means configured for determining a relative amplitude for each of the plurality of selected in-phase input-signal components;
   a second multiplication means configured for multiplying each of the plurality of in-phase intermediate signals with the relative amplitude of its associated one of the plurality of selected in-phase input-signal components to generate a plurality of columns of the in-phase S-matrix component;
   a first summing means configured for summing each of the plurality of columns of the in-phase S-matrix component to generate an in-phase composite column;
   a first storage means configured for storing said in-phase composite column to form the in-phase S-matrix component;
   a second selection means configured for determining which quadrature-phase components of the plurality of input signals to utilize for generating the quadrature-phase S-matrix component for producing a plurality of selected quadrature-phase input-signal components;
   a third multiplication means configured for multiplying each of the plurality of selected quadrature-phase input-signal components with a projection matrix $P_{s_Q}^\perp$ to generate a quadrature intermediate signal, each of the plurality of quadrature-phase intermediate signals having an associated one of the plurality of selected quadrature-phase input-signal components;
   a second amplitude-determination means configured for determining a relative amplitude for each of the plurality of selected quadrature-phase input-signal components;
   a fourth multiplication means configured for multiplying each of the plurality of quadrature-phase intermediate signals with the relative amplitude of its associated one of the plurality of selected quadrature-phase input-signal components to generate a plurality of columns of the quadrature-phase S-matrix component;
   a second summing means configured for summing each of the plurality of columns of the quadrature-phase S-matrix component to generate a quadrature-phase composite column; and
   a second storage means configured for storing said quadrature-phase composite column to form the quadrature-phase S-matrix component.

58. The apparatus recited in claim 57 wherein the plurality of input signals comprises up to 64 input signals.

59. The apparatus recited in claim 57, wherein the first multiplication means further comprises a selective-engagement means configured for determining whether or not to multiply each of the plurality of selected input signals with the projection matrix $P_{s_I}^\perp$.

60. The apparatus recited in claim 57, wherein the third multiplication means further comprises a selective-engagement means configured for determining whether or not to multiply each of the plurality of selected input signals with the projection matrix $P_{s_Q}^\perp$.

61. The apparatus recited in claim 57, wherein the second multiplication means further comprises a selective-engagement means configured for determining whether or not to multiply each of the plurality of in-phase intermediate signals with the relative amplitude of its associated one of the plurality of selected in-phase input-signal components.

62. The apparatus recited in claim 57, wherein the fourth multiplication means further comprises a selective-engagement means configured for determining whether or not to multiply each of the plurality of quadrature-phase intermediate signals with the relative amplitude of its associated one of the plurality of selected quadrature-phase input-signal components.

63. A method for generating an S matrix, said method comprising:
  A. providing for selecting a plurality of input signals for generating the S matrix, the selection means producing a plurality of selected input signals;
  B. providing for multiplying each of the plurality of selected input signals with a projection matrix $P_s^\perp$ to generate a plurality of intermediate signals, each of the plurality of intermediate signals being associated with one of the plurality of selected input signals;
  C. providing for determining a relative amplitude for each of the plurality of selected input signals;
  D. providing for multiplying each of the plurality of intermediate signals with the relative amplitude of its associated one of the plurality of selected input signals to generate a plurality of columns of the S-matrix;
  E. providing for summing the plurality of columns of the S-matrix to generate a composite column; and
  F. providing for storing the first composite column to form the S matrix.

64. An apparatus for generating an S matrix, said apparatus comprising:
  a selection means configured for selecting a plurality of input signals for generating the S matrix, the selection means producing a plurality of selected input signals;
  a first multiplication means configured for multiplying each of the plurality of selected input signals with a projection matrix $P_s^\perp$ to generate a plurality of intermediate signals, each of the plurality of intermediate signals being associated with one of the plurality of selected input signals;
  a determination means configured for determining a relative amplitude for each of the plurality of selected input signals;
  a second multiplication means configured to multiply each of the plurality of intermediate signals with the relative amplitude of its associated one of the plurality of selected input signals to generate a plurality of columns of the S-matrix;
  a summing means configured to sum the plurality of columns of the S-matrix to generate a composite column; and
  a storage means configured for storing the first composite column to form the S matrix.

65. The apparatus recited in claim 64 wherein the plurality of input signals comprises up to 64 input signals.

66. The apparatus recited in claim 64, wherein the first multiplication means further comprises a selective-engagement means configured for determining whether to multiply each of the plurality of selected input signals with the projection matrix $P_s^\perp$.

67. The apparatus recited in claim 64, wherein said second means for multiplying further comprises a selective engagement means for determining whether to multiply each of the plurality of intermediate signals with the relative amplitude of its associated one of the plurality of selected input signals.

* * * * *